(12) United States Patent  
Kato

(10) Patent No.: US 10,387,764 B2
(45) Date of Patent: Aug. 20, 2019

(54) RFID TAG, ARTICLE INCLUDING THE SAME, AND RFID TAG MANUFACTURING METHOD

(71) Applicant: Murata Manufacturing Co., Ltd., Nagaokakyo-shi, Kyoto-fu (JP)

(72) Inventor: Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/299,523

(22) Filed: Mar. 12, 2019

(65) Prior Publication Data

US 2019/0213461 A1 Jul. 11, 2019

Related U.S. Application Data

(63) Continuation of application No. PCT/JP2018/024692, filed on Jun. 28, 2018.

(30) Foreign Application Priority Data

Jun. 30, 2017 (JP) .................................. 2017-129073
Jan. 24, 2018 (JP) .................................. 2018-009976

(51) Int. Cl.
*G06K 19/06* (2006.01)
*G06K 19/077* (2006.01)
(Continued)

(52) U.S. Cl.
CPC . *G06K 19/07777* (2013.01); *G06K 19/07758* (2013.01); *H01Q 1/02* (2013.01); *H01Q 9/0407* (2013.01)

(58) Field of Classification Search
CPC ............... G06K 19/07; G06K 17/0025; G06K 17/0029; G06Q 20/32
(Continued)

(56) References Cited

U.S. PATENT DOCUMENTS 7,342,498 B2 * 3/2008 Baba ................ G06K 19/07749
340/572.5
7,598,873 B2 * 10/2009 Yamagajo ........ G06K 19/07786
340/572.7
(Continued)

FOREIGN PATENT DOCUMENTS

JP 2012253700 A 12/2012
JP 2018032264 A 3/2018
WO 2017014152 A1 1/2017

OTHER PUBLICATIONS

International Search Report issued for PCT/JP2018/024692, dated Sep. 4, 2018.
(Continued)

*Primary Examiner* — Daniel St Cyr
(74) *Attorney, Agent, or Firm* — Arent Fox LLP

(57) ABSTRACT

An RFID tag that can be used when attached to a metal surface of an article. The RFID tag includes a tag main body including a top plate with a back surface facing the metal surface across a space and a top plate support extending from the top plate on the back surface side and including a leading end surface attached to the metal surface. An antenna pattern is disposed on the back surface of the top plate of the tag main body, and an RFIC chip is disposed on the back surface of the top plate part of the tag main body and connected to the antenna pattern. The antenna pattern includes an extension part extending away from the back surface of the top plate part of the tag main body toward the metal surface and connecting to the metal surface by direct current or capacitively.

20 Claims, 23 Drawing Sheets

(51) Int. Cl.
*H01Q 9/04* (2006.01)
*H01Q 1/02* (2006.01)

(58) Field of Classification Search
USPC .............................. 235/492, 462.46, 472.02
See application file for complete search history.

(56) References Cited

U.S. PATENT DOCUMENTS

| 10,210,355 B1* | 2/2019 | Lai ..................... G06K 7/10118 |
| 2009/0021379 A1* | 1/2009 | Zhu .................. G06K 19/07749 340/572.8 |
| 2014/0061319 A1* | 3/2014 | Dokai .................. H01Q 1/2225 235/492 |
| 2014/0366411 A1* | 12/2014 | Sirosaki .................. B60R 13/10 40/208 |
| 2018/0144225 A1 | 5/2018 | Kato |

OTHER PUBLICATIONS

Written Opinion of the International Searching Authority issued for PCT/JP2018/024692, dated Sep. 4, 2018.

* cited by examiner

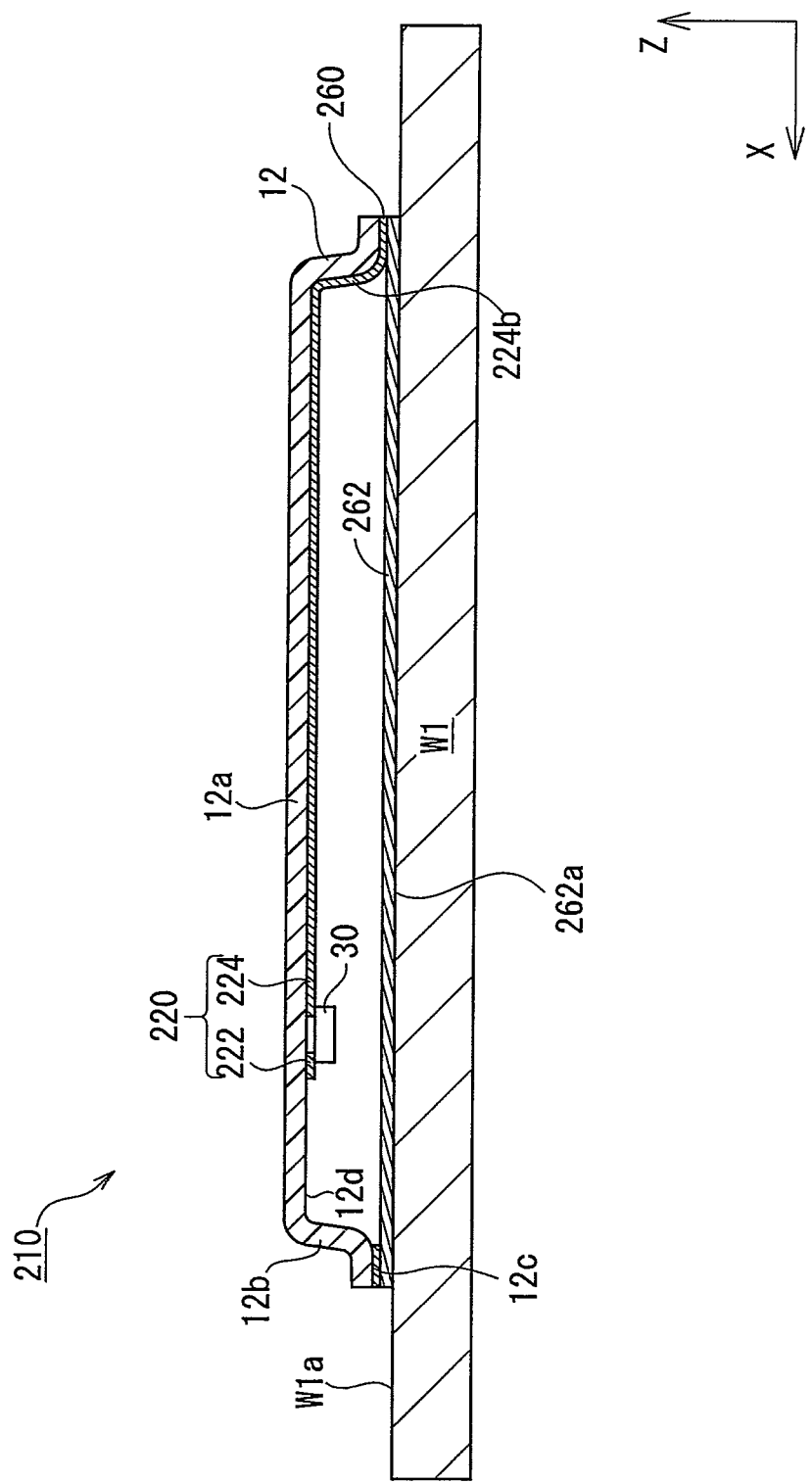

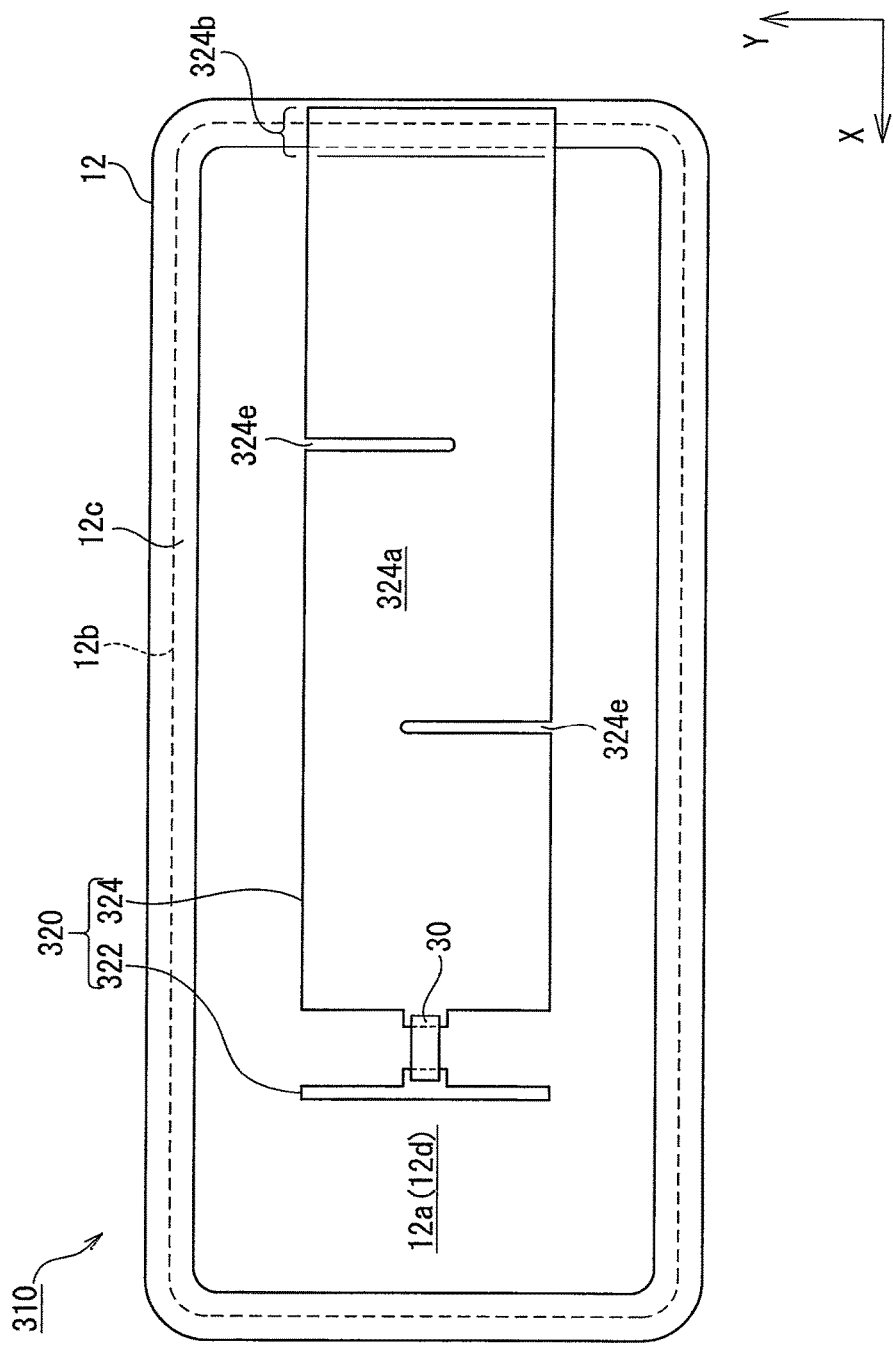

RFID TAG, ARTICLE INCLUDING THE SAME, AND RFID TAG MANUFACTURING METHOD

CROSS REFERENCE TO RELATED APPLICATIONS

The present application is a continuation of PCT/JP2018/024692 filed Jun. 28, 2018, which claims priority to Japanese Patent Application No. 2017-129073, filed Jun. 30, 2017, and Japanese Patent Application No. 2018-009976, filed Jan. 24, 2018, the entire contents of each of which are incorporated herein by reference.

TECHNICAL FIELD

The present disclosure relates to an RFID tag configured for wireless communication even when attached to a metal surface, an article including the same, and an RFID tag manufacturing method.

BACKGROUND

Patent Document 1 (identified below) discloses a wireless communication device (RFID ("Radio-Frequency Identification") tag) in which a wireless IC element (RFIC ("Radio-Frequency Integrated Circuit") chip) and a conductor pattern connected thereto are protected by a protective case made of a resin. The RFIC chip and the conductor pattern are disposed on a surface of a dielectric block that is housed in the protective case. The conductor pattern includes a radiation conductor disposed on a first principal surface of the dielectric block and connected to one terminal of the RFIC chip, a ground conductor disposed on a second principal surface opposite to the first principal surface and connected to the other terminal of the RFIC chip, and a short-circuit conductor connecting the radiation conductor and the ground conductor. By affixing the RFID tag to a metal surface of an article such that the ground conductor faces the metal surface (by capacitively coupling the ground conductor and the metal surface through the protective case), the RFID tag can perform wireless communication even when attached to the metal surface.

Patent Document 1: Japanese Laid-Open Patent Publication No. 2012-253700.

However, the RFID tag described in Patent Document 1 requires many constituent elements and has a complicated structure that increases dimensional variations of members and electric characteristic variations due to temperature characteristics, so that manufacturing costs become high. For example, a dielectric block is required for holding an RFIC chip, a radiation conductor, etc., and if the thermal expansion characteristic of the dielectric block is different from the thermal expansion characteristic of a supporting film of the conductor pattern, the electric characteristics of the RFID tag deteriorate due to temperature cycles. Moreover, since it is necessary to respectively dispose the RFIC chip, the radiation conductor, and the ground conductor on different surfaces of the dielectric block, the supporting film of the conductor pattern must be affixed in a wrapping manner, which makes it difficult to ensure positioning accuracy, so that electric characteristic variations due to processing accuracy increase.

SUMMARY OF THE INVENTION

Therefore, the present invention solves the above-noted problems by providing a simple structure in a RFID tag so that an RFIC chip and conductors connected thereto, such as a radiation conductor, are protected from external environment while reducing characteristic variations due to processing accuracy of the RFID tag and enabling wireless communication even when the RFID tag is attached to a metal surface of an article. Moreover, the invention eliminates a dielectric block and thereby eliminates a change in antenna characteristics of the RFID tag due to a change in temperature of the dielectric block so as to stabilize a reading distance against a change in temperature in usage environment of the RFID tag.

Thus, an exemplary aspect of the present invention provides an RFID tag configured to be used when attached to a metal surface of an article. The exemplary RFID tag includes a tag main body including a top plate part with a back surface facing the metal surface across a space and a top plate support extending from the top plate part on the back surface side and including a leading end surface attached to the metal surface. Moreover, an antenna pattern is disposed on the back surface of the top plate part of the tag main body; and an RFIC chip is disposed on the back surface of the top plate part of the tag main body and connected to the antenna pattern. The antenna pattern includes an extension part extending away from the back surface of the top plate part of the tag main body toward the metal surface and connecting to the metal surface in terms of a direct current or capacitively.

Another exemplary aspect of the present invention provides an article at least partially including a metal surface and having an RFID tag attached to the metal surface. In this aspect, the RFID tag includes a tag main body including a top plate part with a back surface facing the metal surface across a space and a top plate supporting part extending from the top plate part on the back surface side and including a leading end surface attached to the metal surface, an antenna pattern disposed on the back surface of the top plate part of the tag main body, and an RFIC chip disposed on the back surface of the top plate part of the tag main body and connected to the antenna pattern. Moreover, the antenna pattern includes an extension part that extends away from the back surface of the top plate part of the tag main body toward the metal surface and connecting to the metal surface in terms of a direct current or capacitively.

Yet another exemplary aspect of the present invention provides an RFID tag manufacturing method that includes printing an annular pattern on an outer circumferential edge of a flat plate and printing an antenna pattern connected to the annular pattern in the annular pattern by using a conductive paste; molding the flat plate after the printing into a cap shape to fabricate a cap-shaped member including the antenna pattern present on a back surface of a top plate part and the annular pattern present on an opening edge part; forming a plating layer on the annular pattern and the antenna pattern by electrolytic plating; disposing an RFIC chip on the back surface of the top plate part of the cap-shaped member and connecting the RFIC chip to the antenna pattern; and attaching to the opening edge part of the cap-shaped member a conductor plate covering the inside of the cap-shaped member and connected to the annular pattern.

According to the present invention, a simple structure for an RFID tag is provided so that an RFIC chip and conductors connected thereto, such as a radiation conductor, are protected from external environment while reducing characteristic variations due to processing accuracy of the RFID tag and enabling wireless communication even when the RFID tag is attached to a metal surface of an article, and a dielectric block can be eliminated to thereby eliminate a change in antenna characteristics of the RFID tag due to a change in temperature of the dielectric block so as to stabilize a reading distance against a change in temperature in usage environment of the RFID tag.

BRIEF DESCRIPTION OF DRAWINGS

FIG. 11 is a cross-sectional view of the RFID tag attached to the metal surface of the article.

FIG. 13 is a bottom view of an RRID tag according to another embodiment.

DETAILED DESCRIPTION

Figure 1:
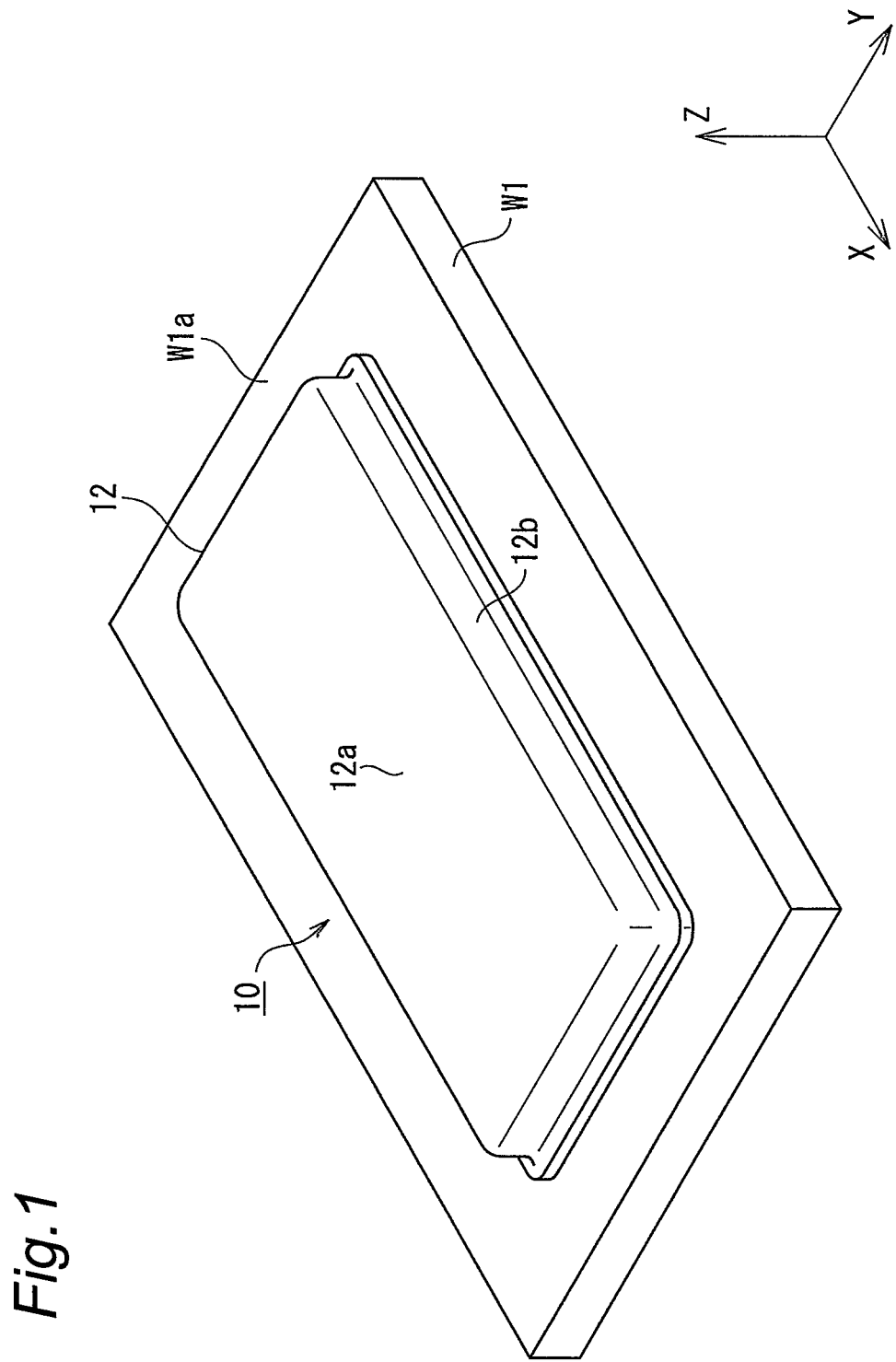
FIG. 1 is a perspective view of an RFID tag according to a first exemplary embodiment attached to a metal surface of an article.

An RFID tag according to an exemplary aspect is configured to be used when attached to a metal surface of an article. The RFID tag includes tag main body including a top plate part with a back surface facing the metal surface across a space and a top plate supporting part extending from the top plate part on the back surface side and including a leading end surface attached to the metal surface; an antenna pattern disposed on the back surface of the top plate part of the tag main body; and an RFIC chip disposed on the back surface of the top plate part of the tag main body and connected to the antenna pattern. Moreover, the antenna pattern includes an extension part extending away from the back surface of the top plate part of the tag main body toward the metal surface and connecting to the metal surface in terms of a direct current or capacitively.

According to this aspect, the RFID tag can be provided with a simple structure so that an RFIC chip and conductors connected thereto such as a radiation conductor are protected from external environment while reducing characteristic variations due to processing accuracy of the RFID tag and enabling wireless communication even when the RFID tag is attached to a metal surface of an article, and a dielectric block can be eliminated to thereby eliminate a change in antenna characteristics of the RFID tag due to a change in temperature of the dielectric block so as to stabilize a reading distance against a change in temperature in usage environment of the RFID tag.

In an exemplary aspect, the tag main body may be a cap-shaped member in which the top plate supporting part extends in a tube shape from an outer circumferential edge of the top plate part, and the leading end surface of the top plate supporting part may be an opening edge part of the cap-shaped member.

Moreover, a leading end part of the extension part of the antenna pattern can be located on the opening edge part of the cap-shaped member.

In addition, according to an exemplary aspect the extension part of the antenna pattern can extend beyond the opening edge part toward the outside of the cap-shaped member.

Furthermore, an annular pattern of a conductor can be disposed on the opening edge part of the cap-shaped member, and the extension part of the antenna pattern may be connected to the annular pattern.

The RFID tag can comprise a conductor plate attached to the opening edge part to cover the inside of the cap-shaped member and connected to the annular pattern. As a result, the waterproof/dustproof RFID tag can be achieved.

According to an exemplary aspect, the antenna pattern can include a first sub-pattern connected to a first input/output terminal of the RFIC chip and a second sub-pattern spaced at a distance from the first sub-pattern, connected to a second input/output terminal of the RFIC chip, and including the extension part. Moreover, the first sub-pattern can have an area smaller than the area of the second sub-pattern; and the first sub-pattern can include a first belt-shaped part extending in one direction and a second belt-shaped part extending in a direction opposite to the one direction when viewed from a connection point to the first input/output terminal.

The antenna pattern can be an inverted-F antenna, and the antenna pattern and the annular pattern may be integrated as one component by connecting a feeder line part and a short-circuit line part of the inverted-F antenna to the annular pattern. As a result, the antenna pattern and the annular pattern can be fabricated from one metal sheet or metal plate, for example.

In an exemplary aspect, the RFID tag can comprise an RFIC module including the RFIC chip and a matching circuit matching the RFIC chip and the antenna pattern, and the RFIC module may further include at least one of a temperature sensor detecting an external temperature of the cap-shaped member and a humidity sensor detecting an external humidity of the cap-shaped member. As a result, at least one of the temperature and the humidity of the RFID tag can be measured, and the measurement result can be transmitted.

The tag main body can be made of a resin material and may have flexibility. As a result, the RFID tag can be attached to not only a flat surface but also a curved surface.

In an exemplary aspect, the tag main body can include an auxiliary supporting part extending from the back surface of the top plate part and coming into contact with the metal surface. As a result, deformation of the tag main body can be suppressed when attached to the metal surface.

An article according to another exemplary aspect of the present invention at least partially includes a metal surface and has an RFID tag attached to the metal surface. Moreover, the RFID tag includes a tag main body with a top plate part with a back surface facing the metal surface across a space and a top plate supporting part that extends from the top plate part on the back surface side and includes a leading end surface attached to the metal surface. In addition, an antenna pattern is disposed on the back surface of the top plate part of the tag main body, and an RFIC chip is disposed on the back surface of the top plate part of the tag main body and connected to the antenna pattern. In this aspect, the antenna pattern includes an extension part extending away from the back surface of the top plate part of the tag main body toward the metal surface and connecting to the metal surface in terms of a direct current or capacitively.

According to this aspect, the RFID tag can have a simple structure so that an RFIC chip and conductors connected thereto such as a radiation conductor are protected from external environment while reducing characteristic variations due to processing accuracy of the RFID tag and enabling wireless communication even when the RFID tag is attached to a metal surface of an article, and a dielectric block can be eliminated to thereby eliminate a change in antenna characteristics of the RFID tag due to a change in temperature of the dielectric block so as to stabilize a reading distance against a change in temperature in usage environment of the RFID tag.

An RFID tag manufacturing method according to another exemplary aspect of the present invention is provided that includes printing an annular pattern on an outer circumferential edge of a flat plate and printing an antenna pattern connected to the annular pattern in the annular pattern by using a conductive paste; molding the flat plate after the printing into a cap shape to fabricate a cap-shaped member including the antenna pattern present on a back surface of a top plate part and the annular pattern present on an opening edge part; forming a plating layer on the annular pattern and the antenna pattern by electrolytic plating; disposing an RFIC chip on the back surface of the top plate part of the cap-shaped member and connecting the RFIC chip to the antenna pattern; and attaching to the opening edge part of the cap-shaped member a conductor plate covering the inside of the cap-shaped member and connected to the annular pattern.

According to this aspect, a simple structure for an RFID tag can be provided so that an RFIC chip and conductors connected thereto such as a radiation conductor are protected from external environment while reducing characteristic variations due to processing accuracy of the RFID tag and enabling wireless communication even when the RFID tag is attached to a metal surface of an article. Moreover, a dielectric block can be eliminated to thereby eliminate a change in antenna characteristics of the RFID tag due to a change in temperature of the dielectric block so as to stabilize a reading distance against a change in temperature in usage environment of the RFID tag. Additionally, the waterproof/dustproof RFID tag can be fabricated.

Exemplary embodiments of the present invention will now be described with reference to the drawings.

First Exemplary Embodiment

Figure 2:
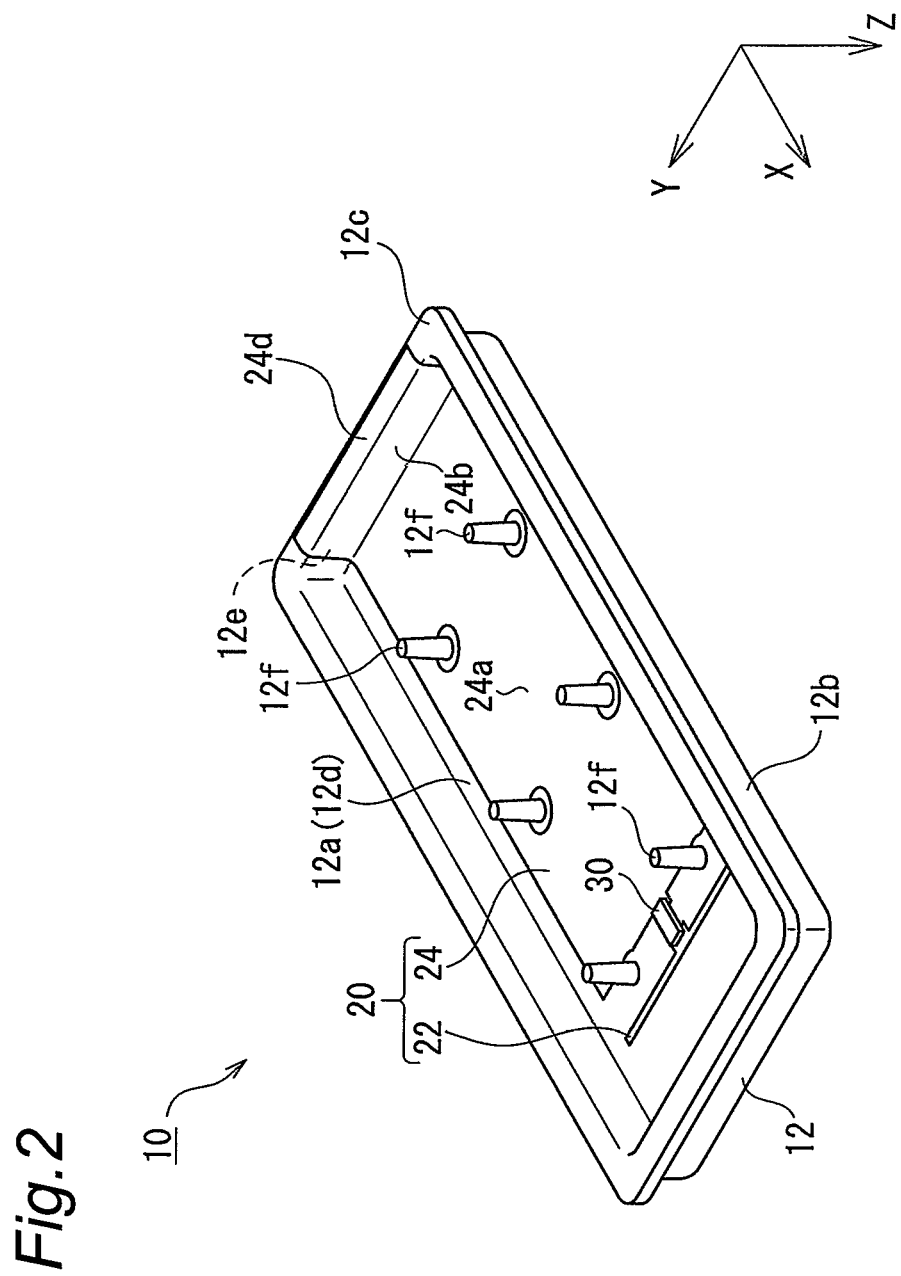
FIG. 2 is a perspective view of the RFID tag as viewed in a different direction.
Figure 3:
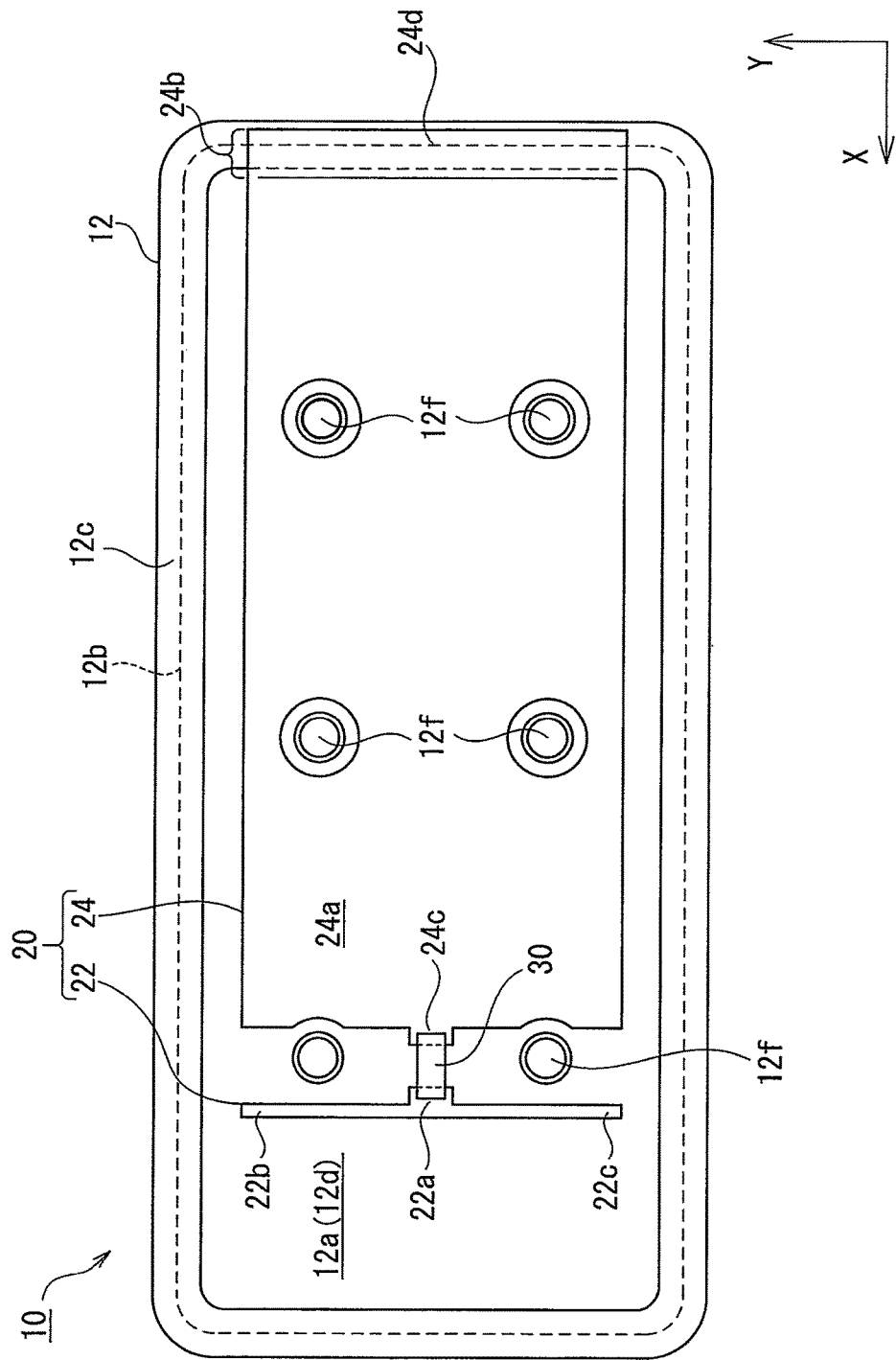
FIG. 3 is a bottom view of the RFID tag.
Figure 4:
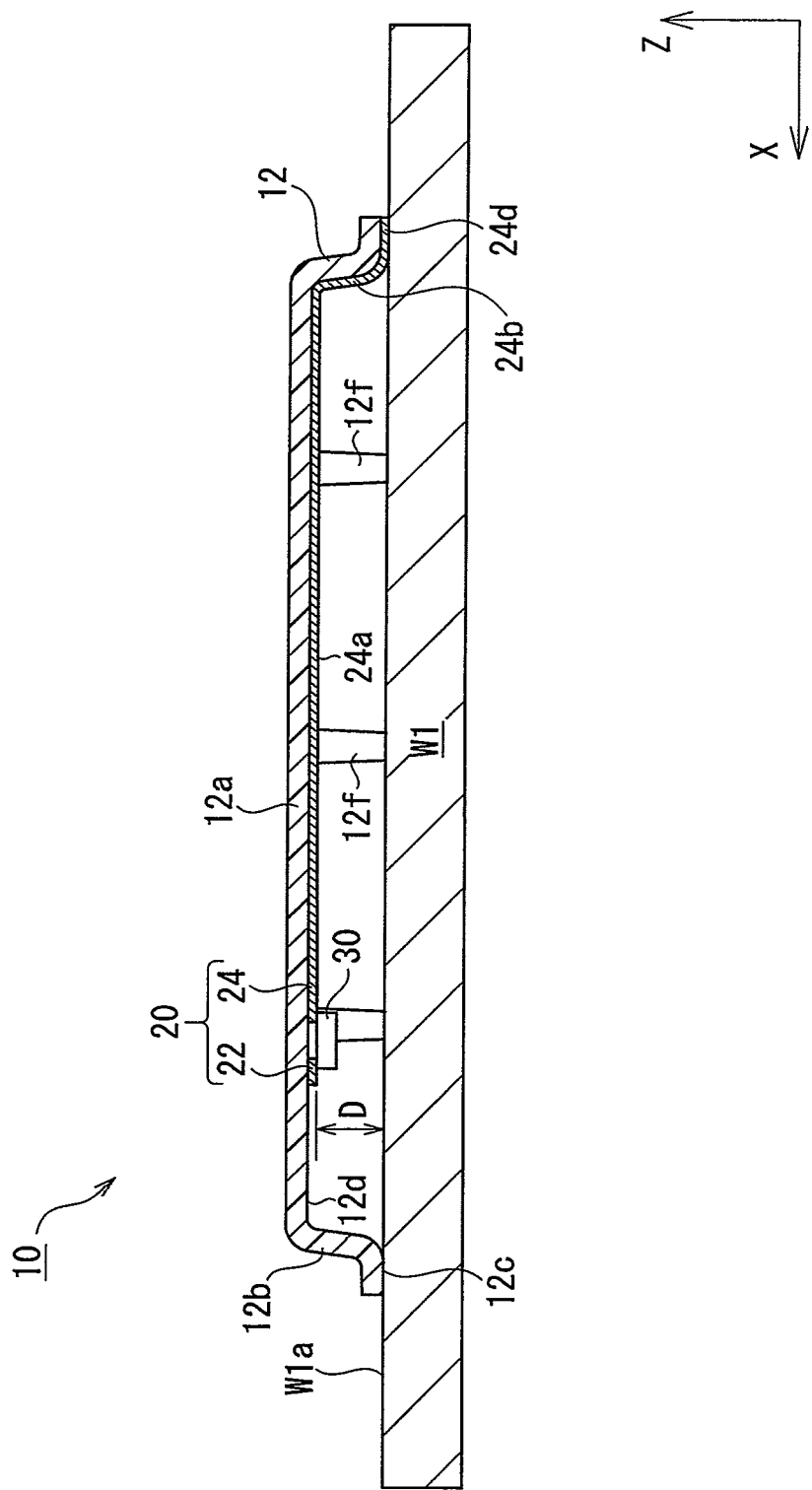
FIG. 4 is a cross-sectional view of the RFID tag attached to the metal surface of the article.

FIG. 1 is a perspective view showing an RFID (Radio-Frequency IDentification) tag according to a first exemplary embodiment, and FIG. 2 is a perspective view of the RFID tag as viewed in a different direction. FIG. 3 is a bottom view of the RFID tag, and FIG. 4 is a cross-sectional view of the RFID tag. In the figures, an X-Y-Z coordinate system is for facilitating understanding of the exemplary embodiments and does not limit the invention. An X-axis direction indicates a longitudinal direction, a Y-axis direction indicates a width direction, and a Z-axis direction indicates a thickness direction.

FIG. 1 shows an RFID tag 10 attached to a metal surface W1a of an article W1 such as a metal plate, for example. FIG. 2 shows an underside of the RFID tag 10 when it is turned over.

As shown in FIGS. 1 and 2, the RFID tag 10 includes a cap-shaped member 12 that is a tag main body, an antenna pattern 20 disposed on the cap-shaped member 12, and an RFIC (Radio-Frequency Integrated Circuit) module 30 disposed on the cap-shaped member 12.

According to an exemplary aspect, the cap-shaped member 12 is made of a resin material such as polycarbonate, polypropylene, polyester, and polyether ether ketone, for example. In the first embodiment, the cap-shaped member 12 includes a flat plate-shaped top plate part 12a (i.e., a top plate) and a tube-shaped side wall part 12b extending from an outer circumferential edge of the top plate part 12a. As shown in FIGS. 1 and 4, the RFID tag 10 is configured to be attached to the metal surface W1a of the article W1 at a leading end surface 12c of the side wall part 12b, i.e., an opening edge part 12c of the cap-shaped member 12. For example, the opening edge part 12c is affixed to the metal surface W1a via an adhesive or a double-sided tape (not shown), or the like. In the first embodiment, to expand a contact area to the metal surface W1a, the leading end of the side wall part 12b is formed into a flange shape so that the area of the opening edge part 12c is increased.

By attaching the RFID tag 10 to the metal surface W1a of the article W1 via the side wall part 12b as described above, as shown in FIG. 4, a back surface 12d of the top plate part 12a of the cap-shaped member 12 faces the metal surface W1a across a space (i.e., having a distance "D"). In the case of the first embodiment, the back surface 12d of the top plate part 12a is parallel to the metal surface W1a. Therefore, the side wall part 12b functions as a top plate supporting part extending from the top plate part 12a toward the back surface 12d and supporting the top plate part 12a with a space formed from the metal surface W1a.

As shown in FIGS. 2 and 3, in the first embodiment, the antenna pattern 20 is disposed on the back side of the cap-shaped member 12 (a surface out of sight when the RFID tag 10 is attached to the metal surface W1a, as shown in FIG. 1).

The antenna pattern 20 is formed of a conductor sheet such as an aluminum sheet or a copper sheet and is affixed to the cap-shaped member 12 by a double-sided tape, for example. Specifically, the antenna pattern 20 is disposed on the back surface 12d of the top plate part 12a, an inner wall surface 12e of the side wall part 12b, and the opening edge part 12c of the cap-shaped member 12.

According to the first embodiment, as shown in FIG. 3, the antenna pattern 20 includes a first sub-pattern 22 and a second sub-pattern 24 as described above.

As shown in FIG. 3, the first sub-pattern 22 is a substantially "T"-shaped pattern entirely disposed on the back surface 12d of the top plate part 12a of the cap-shaped member 12. Therefore, as shown in FIG. 4, when the RFID tag 10 is attached to the metal surface W1a of the article W1, the first sub-pattern 22 faces the metal surface W1a at an interval (i.e., distance D), i.e., across an air layer or space.

Specifically, as shown in FIG. 3, the first sub-pattern 22 is entirely a pattern substantially elongated in the width direction (Y-axis direction) of the RFID tag 10. More specifically, the first sub-pattern 22 includes a land part 22a connected to one external connection terminal (described in detail later) of the RFIC module 30, a first belt-shaped part 22b extending from the land part 22b on one side in the width direction (i.e., in the Y-axis direction) of the RFID tag 10, and a second belt-shaped part 22c extending from the land part 22a in the opposite direction (i.e., also in the Y-axis direction). The benefits of the configuration of the first sub-pattern 22 having this shape will be described later.

The second sub-pattern 24 is spaced at a distance from the first sub-pattern 22 and is a belt-shaped pattern extending in the longitudinal direction (i.e., X-axis direction) of the RFID tag 10 and having a width (size in the Y-axis direction) larger than the width (size in the X-axis direction) of the first sub-pattern 22. The second sub-pattern 24 has an area sufficiently larger than the first sub-pattern 22 (an area orthogonal to the thickness direction (i.e., Z-axis direction) of the RFID tag 10).

Specifically, as shown in FIG. 2, the second sub-pattern 24 includes a main body 24a disposed on the back surface 12d of the top plate part 12a of the cap-shaped member 12 and an extension part 24b disposed from the inner wall surface 12e of the side wall part 12b over the opening edge part 12c. As shown in FIG. 3, the main body part 24a includes a land part 24c facing the land part 22a of the first sub-pattern 22 at a distance in the longitudinal direction (X-axis direction) of the RFID tag 10. Although the details will be described later, the other external connection terminal of the RFIC module 30 is connected to the land part 24c of the second sub-pattern 24.

In the first embodiment, as shown in FIG. 4, the extension part 24b of the second sub-pattern 24 extends from the main body part 24a in the longitudinal direction (X-axis direction) of the RFID tag 10 away from the first sub-pattern 22. The extension part 24b extends away from the back surface 12d of the top plate part 12a of the cap-shaped member 12 toward the metal surface W1a of the article W1. In the first embodiment, the extension part 24b extends along the inner wall surface 12e of the side wall part 12b of the cap-shaped member 12 away from the back surface 12d so that a leading end portion 24d thereof is located on the opening edge part 12c.

As shown in FIG. 4, the leading end portion 24d of the extension part 24b of the second sub-pattern 24 is electrically connected to the metal surface W1a when the RFID tag 10 is attached to the metal surface W1a of the article W1.

Specifically, when the opening edge part 12c of the cap-shaped member 12 is attached to the metal surface W1a of the article W1 via a conductive adhesive or double-sided tape, or the like, the leading end portion 24d is connected to the metal surface W1a through the conductive adhesive, double-sided tape, or the like. Therefore, the leading end portion 24d is connected in terms of a direct current.

On the other hand, when the opening edge part 12c of the cap-shaped member 12 is attached to the metal surface W1a of the article W1 via an insulating adhesive, double-sided tape, or the like, the leading end portion 24d is connected to the metal surface W1a through the insulating adhesive or double-sided tape etc. Therefore, the leading end portion 24d is connected capacitively (capacitively coupled) to the metal surface W1a.

According to the antenna pattern 20 as described above, as shown in FIG. 4, when the RFID tag 10 (the cap-shaped member 12) is attached to the metal surface W1a of the article W1, the first sub-pattern 22 and the main body part 24a of the second sub-pattern 24 are arranged at the interval (distance D), i.e., across the air layer, with respect to the metal surface W1a. At the same time, the leading end portion 24d of the extension part 24b of the second sub-pattern 24 is connected to the metal surface W1a in terms of a direct current or capacitively.

If a portion of the opening edge part 12c of the cap-shaped member 12 excluding the leading end portion 24d of the second sub-pattern 24 of the antenna pattern 20 is stably and firmly fixed to the metal surface W1a, the leading end portion 24d of the antenna pattern 20 may be simply in contact with the metal surface W1a without being fixed.

To suppress deformation of the cap-shaped member 12 (e.g., deformation such as that causing the top plate part 12a to approach the metal surface W1a) after the RFID tag 10 is attached to the metal surface W1a of the article W1, as shown in FIG. 2, the cap-shaped member 12 may be provided with at least one columnar auxiliary supporting part 12f. The auxiliary supporting part 12f extends from the back surface 12d of the top plate part 12a and has a leading end coming into contact with the metal surface W1a.

The auxiliary supporting part 12f (i.e., an auxiliary support) as described above suppresses the deformation of the cap-shaped member 12 such as that causing the top plate part 12a to approach the metal surface W1a. As a result, the distance D is stably maintained between the antenna pattern 20 (the first sub-pattern 22 and the main body part 24a of the second sub-pattern 24) disposed on the back surface 12d and the metal surface W1a. Furthermore, this also suppresses breakage of the RFID tag 10 and dropout of the RFID tag 10 from the metal surface W1a caused by the deformation bringing the top plate part 12a closer to the metal surface W1a.

As shown in FIGS. 2 and 3, the RFIC module 30 is a wireless communication device that can be configured to perform wireless communication at a communication frequency of, for example, the 900 MHz band, i.e., the UHF band, and is disposed on the back surface 12d of the top plate part 12a of the cap-shaped member 12. To perform wireless communication, the RFIC module 30 is connected to the first sub-pattern 22 and the second sub-pattern 24 of the antenna pattern 20 by direct connection such as soldering or capacitive coupling through an adhesive. The RFIC module 30 will be described with reference to FIGS. 5 and 6.

Figure 5:
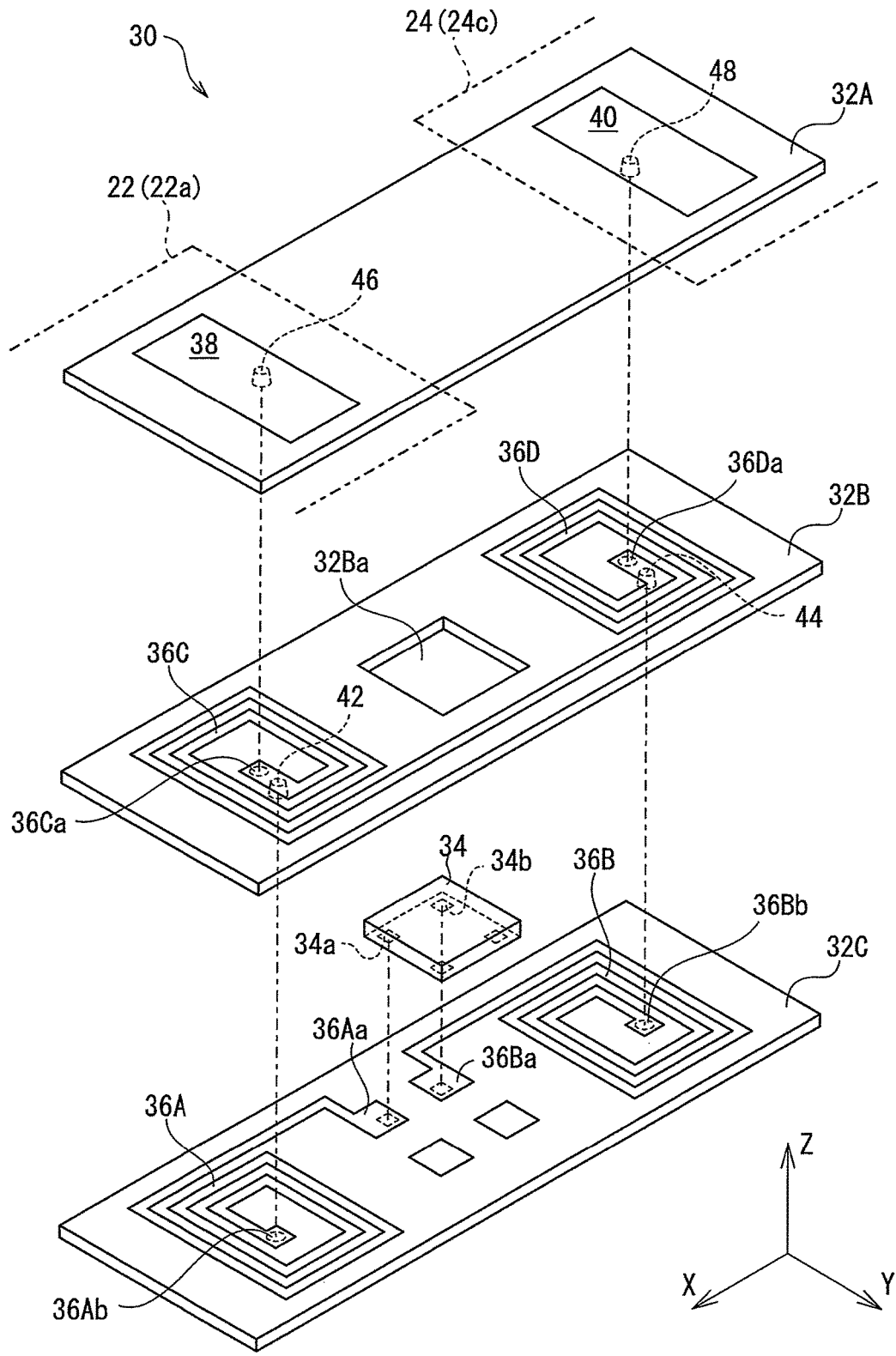
FIG. 5 is an exploded perspective view of an RFIC module.
Figure 6:
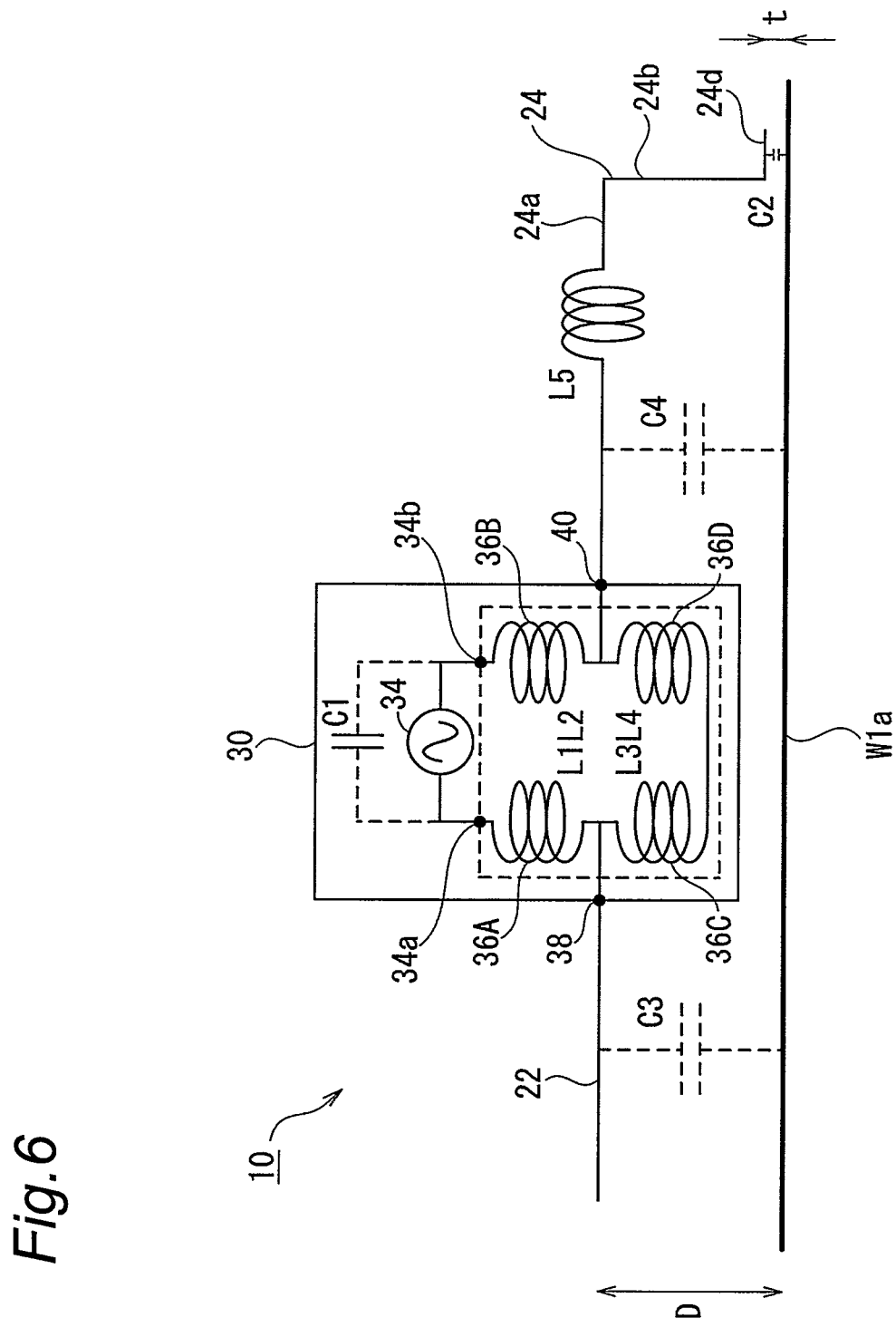
FIG. 6 is an equivalent circuit diagram of the RFID tag attached to the metal surface of the article.

FIG. 5 is an exploded perspective view of the RFIC module 30. FIG. 6 is an equivalent circuit diagram of the RFID tag 10 attached to the metal surface W1a of the article W1.

As shown in FIG. 5, for the first embodiment, the RFIC module 30 is formed by a multilayer board made up of three layers. Specifically, the RFIC module 30 is formed by laminating insulating sheets 32A, 32B, and 32C made of a resin material such as polyimide and liquid crystal polymer and have flexibility. FIG. 5 shows a state in which the RFIC module 30 shown in FIG. 2 is turned over and disassembled.

As shown in FIG. 5, the RFIC module 30 has an RFIC chip 34, a plurality of inductance elements 36A, 36B, 36C, and 36D, and external connection terminals 38, 40. For the first embodiment, the inductance elements 36A to 36D and the external connection terminals 38, 40 are formed by conductor patterns formed on the insulating sheets 32A to 32C and made of a conductive material such as copper.

As shown in FIG. 5, the RFIC chip 34 is mounted on a center portion in the longitudinal direction (X-axis direction) of the insulating sheet 32C. The RFIC chip 34 has a structure having various elements incorporated in a semiconductor substrate made of a semiconductor such as silicon. The RFIC chip 34 includes a first input/output terminal 34a and a second input/output terminal 34b. As shown in FIG. 6, the RFIC chip 34 also includes an internal capacitance (capacitance: self-capacitance owned by the RFIC chip itself) C1.

As shown in FIG. 5, the inductance element (first inductance element) 36A is made up of a conductor pattern disposed in a spiral coil shape on the insulating sheet 32C on one side in the longitudinal direction (X-axis direction) of the insulating sheet 32C. As shown in FIG. 6, the inductance element 36A includes an inductance L1. A land 36Aa connected to the first input/output terminal 34a of the RFIC chip 34 is disposed at one end (an end on the coil outer side) of the inductance element 36A. A land 36Ab is also disposed at the other end (an end on the coil center side).

Moreover, as further shown in FIG. 5, the inductance element (second inductance element) 36B comprises a conductor pattern disposed in a spiral coil shape on the insulating sheet 32C on the other side in the longitudinal direction (X-axis direction) of the insulating sheet 32C. As shown in FIG. 6, the inductance element 36B includes an inductance L2. A land 36Ba connected to the second input/output terminal 34b of the RFIC chip 34 is disposed at one end (an end on the coil outer side) of the inductance element 36A. A land 36Bb is also disposed at the other end (an end on the coil center side).

As also shown in FIG. 5, the inductance element (third inductance element) 36C is made up of a conductor pattern disposed in a spiral coil shape on the insulating sheet 32B on one side in the longitudinal direction (X-axis direction) of the insulating sheet 32B. The inductance element 36C is opposite to the inductance element 36A in the lamination direction (Z-axis direction). As shown in FIG. 6, the inductance element 36C includes an inductance L3. A land 36Ca is disposed at one end (an end on the coil center side) of the inductance element 36C. The land 36Ca is connected to the land 36Ab of the inductance element 36A on the insulating sheet 32C via an interlayer connection conductor 42 such as a through-hole conductor penetrating the insulating sheet 32B.

As shown in FIG. 5, the inductance element (fourth inductance element) 36D is made up of a conductor pattern disposed in a spiral coil shape on the insulating sheet 32B on the other side in the longitudinal direction (X-axis direction) of the insulating sheet 32B. The inductance element 36D is opposite to the inductance element 36B in the lamination direction (Z-axis direction). As shown in FIG. 6, the inductance element 36D includes an inductance L4. A land 36Da is disposed at one end (an end on the coil center side) of the inductance element 36D. The land 36Da is connected to the land 36Bb of the inductance element 36B on the insulating sheet 32C via an interlayer connection conductor 44 such as a through-hole conductor penetrating the insulating sheet 32B.

The inductance elements 36C, 36D on the insulating sheet 32B are integrated as one conductor pattern. In other words, the other ends (ends on the coil center side) of the respective elements are connected to each other. The insulating sheet 32B is provided with a through-hole 32Ba in which the RFIC chip 34 mounted on the insulating sheet 32C is housed.

As shown in FIG. 5, the external connection terminals 38, 40 comprise conductor patterns disposed on the insulating sheet 32A. The external connection terminals 32, 40 face each other in the longitudinal direction (X-axis direction) of the insulating sheet 32A.

The one external connection terminal 38 is connected to the land 36Ca of the inductance element 36C on the insulating sheet 32B via an interlayer connection conductor 46 such as a through-hole conductor penetrating the insulating sheet 32A.

The other external connection terminal 40 is connected to the land 36Da of the inductance element 36D on the insulating sheet 32B via an interlayer connection conductor 48 such as a through-hole conductor penetrating the insulating sheet 32A.

Moreover, the one external connection terminal 38 is connected to the land part 22a of the first sub-pattern 22 of the antenna pattern 20 via solder, for example. Similarly, the other external connection terminal 40 is connected to the land part 24c of the second sub-pattern 24 via solder, for example.

According to the exemplary aspect, the RFIC chip 34 is formed of a semiconductor substrate. The RFIC chip 34 is present between the inductance elements 36A, 36B and between the inductance elements 36C, 36D. Since this RFIC chip 34 functions as a shield, the magnetic field coupling and the capacitive coupling are suppressed between the spiral coil-shaped inductance elements 36A, 36B disposed on the insulating sheet 32C. Similarly, the magnetic field coupling and the capacitive coupling are suppressed between the spiral coil-shaped inductance elements 36C, 36D disposed on the insulating sheet 32B. Consequently, a pass band of a communication signal can be prevented from narrowing according to this configuration.

Moreover, as shown in FIG. 6, a matching circuit for matching between the RFIC chip 34 and the antenna pattern 20 is formed of the capacitance C1 (the internal capacitance of the RFIC chip 34) and the inductances L1 to L4 (the inductances of the four inductance elements). An inductance L5 indicates the inductance of the second sub-pattern 24.

FIG. 6 shows a state in which the leading end portion 24d of the extension part 24b of the second sub-pattern 24 is capacitively connected to the metal surface W1a of the article W1. For example, the leading end portion 24d is attached to the metal surface W1a via an insulating double-sided tape having a thickness t (t<D) so that a capacitance C2 is formed between the leading end portion 24d and the metal surface W1a in this state.

According to the configuration described above, the RFID tag 10 exchanges radio waves with an external wireless communication device (e.g., a reader/writer device) substantially through the second sub-pattern 24 when the tag is not attached to the metal surface W1a, or substantially through the second sub-pattern 24 and the metal surface W1a when the tag is attached to the metal surface W1a.

The first sub-pattern 22 is configured to substantially function as an exciter exciting the second sub-pattern 24 (radiating radio waves from the second sub-pattern 24). This is because the second sub-pattern 24 has an area sufficiently larger than the first sub-pattern 22 (an area orthogonal to the thickness direction (Z-axis direction) of the RFID tag 10).

For example, when radio waves are received through the second sub-pattern 24 or the metal surface W1a, an electromotive force is generated therein, and the RFIC chip 34 of the RFIC module 30 is driven by the electromotive force. As a result, the driven RFIC chip 34 transmits data stored in a storage part thereof through the second sub-pattern 24 or the metal surface W1a.

As shown in FIG. 6, a capacitance C3 is formed between the first sub-pattern 22 and the metal surface W1a, and a capacitance C4 is formed between the main body part 24a of the second sub-pattern 24 and the metal surface W1a. However, since the metal surface W1a faces the first sub-pattern 22 and the main body part 24a of the second sub-pattern 24 across the air layer, the capacitances C3, C4 formed therebetween are sufficiently small and do not substantially affect communication characteristics, especially communication distance. Therefore, the distance D from the first sub-pattern 22 and the main body part 24a of the second sub-pattern 24 to the metal surface W1a can be made as small as possible within a range not substantially affecting the communication characteristics, so that the RFID tag 10 can be reduced in thickness.

Additionally, the first sub-pattern 22 is configured such that when the RFID tag 10 is attached to the metal surface W1a, a magnetic field generated by a current flowing therethrough does not interfere with radio wave radiation from the second sub-pattern 24.

Figure 7:
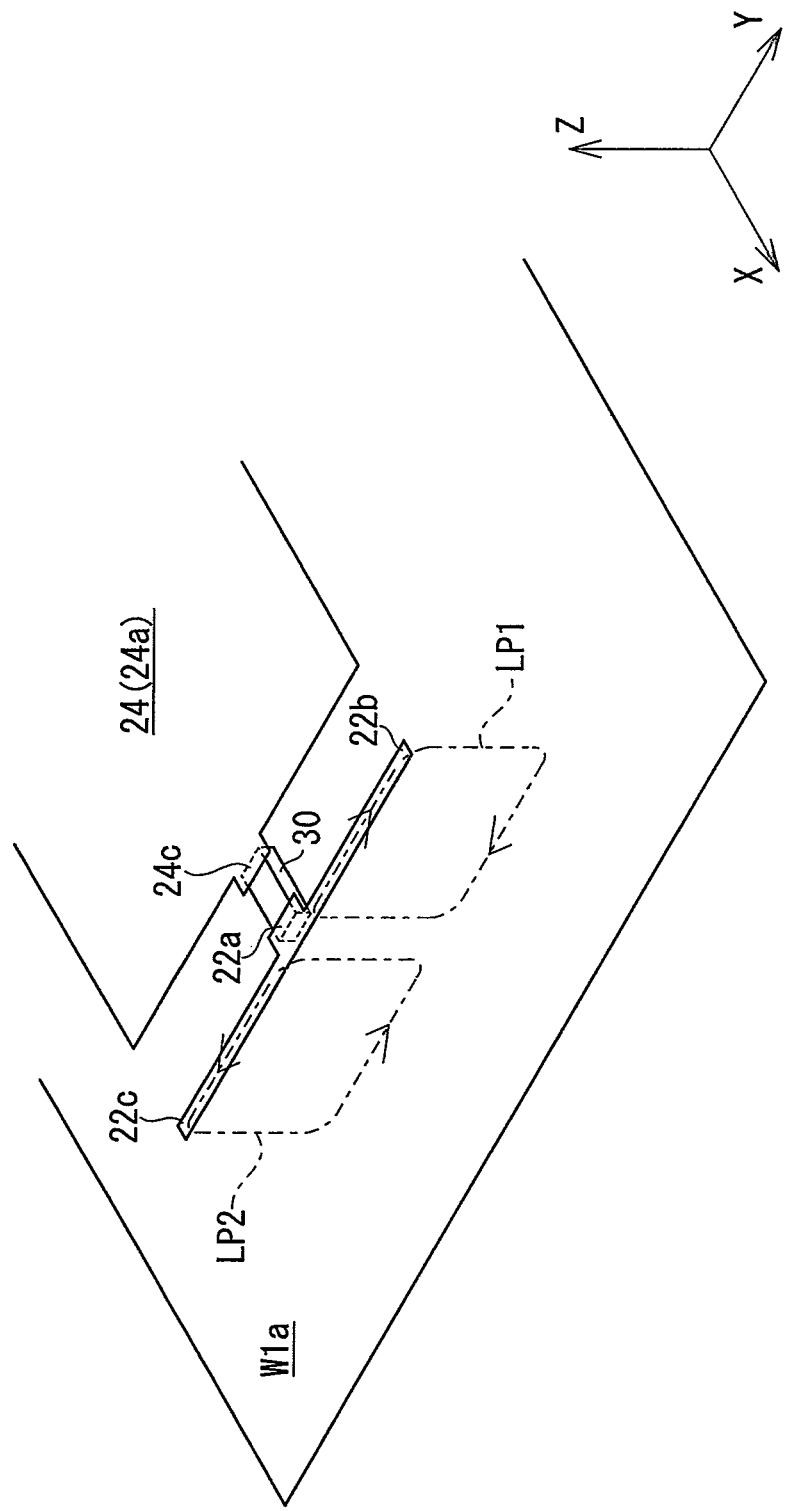
FIG. 7 is a perspective view for explaining a function of a first sub-pattern in an antenna pattern.

Specifically, as shown in FIG. 7, which is an enlarged view of the first sub-pattern 22, the first sub-pattern 22 includes a first belt-shaped part 22b extending from the land part 22a in one direction and the second belt-shaped part 22c extending from the land part 22a in a direction opposite to the one direction. Therefore, as indicated by a dashed-dotted line, a current flowing through the first belt-shaped part 22b and a current flowing through the second belt-shaped part 22c flow in directions opposite to each other.

Focusing on the first belt-shaped part 22b, the current flows through a portion of the metal surface W1a facing the first belt-shaped part 22b in the direction opposite to the current flowing through the first belt-shaped part 22b. This generates a current loop LP1 going from the first belt-shaped part 22b through the portion of the opposing metal surface W1a and returning to the first belt-shaped part 22b. A magnetic field is generated by this current loop LP, and this magnetic field interferes with the radio wave radiation from the main body part 24a of the second sub-pattern 24.

A magnetic field for canceling the magnetic field generated by the current loop LP1 is generated by the current flowing through the second belt-shaped part 22c. Since the current flowing through the first belt-shaped part 22b and the current flowing through the second belt-shaped part 22c flow in directions opposite to each other, a current loop LP2 is generated in the direction opposite to the current loop LP1 by the current flowing through the second belt-shaped part 22c. The magnetic field generated by the current loop LP2 cancels the magnetic field generated by the current loop LP1.

Since the first and second belt-shaped parts 22b, 22c are included, the magnetic field generated by the first sub-pattern 22 is restrained from interfering with the radio wave radiation of the second sub-pattern 24. The first and second belt-shaped parts 22b, 22c preferably have the same length (have the same size in the width direction (Y-axis direction) of the RFID tag 10). However, even if the lengths are different, the magnetic field generation from the first sub-pattern 22 can sufficiently be suppressed (e.g., as compared to the first sub-pattern without the first belt-shaped part or the second belt-shaped part). The first and second belt-shaped parts 22b, 22c may not have a linear shape and may have a meander shape, for example.

According to the first exemplary embodiment as described above, a simple structure is achieved in the RFID tag 10 so that the RFIC chip 34 (RFIC module 30) and the antenna pattern 20 connected thereto can be protected while reducing characteristic variations due to processing accuracy of the RFID tag and enabling wireless communication even when the RFID tag is attached to the metal surface W1a.

Specifically, the RFIC module 30 including the RFIC chip 34 and the antenna pattern 20 connected thereto are directly disposed on the cap-shaped member 12 for protecting the module and the pattern. In particular, the cap-shaped member 12 serves as a member protecting the RFIC module 30 and the antenna pattern 20 from external environment and also serves as a member holding the RFIC module 30 and the antenna pattern 20. This eliminates the need for implementing a complicated configuration such as disposing the RFIC chip 34 and the antenna pattern 20 on a board, a block, etc., and protecting the board, the block, etc. with a protective case, for example. Since no dielectric block is included, a change in reading distance due to temperature can be prevented from occurring due to a change in resonance frequency of the RFID tag caused by a change in electrical length of the antenna pattern 20 according to temperature characteristics of the dielectric constant of the dielectric block. This enables the fabrication of the RFID tag having a stable reading distance over a wide temperature range.

Second Exemplary Embodiment

This second embodiment is an improved form of the first embodiment and is different in the second sub-pattern in the antenna pattern from the first embodiment. Therefore, the second embodiment will mainly be described in terms of differences from the first embodiment.

Figure 8:
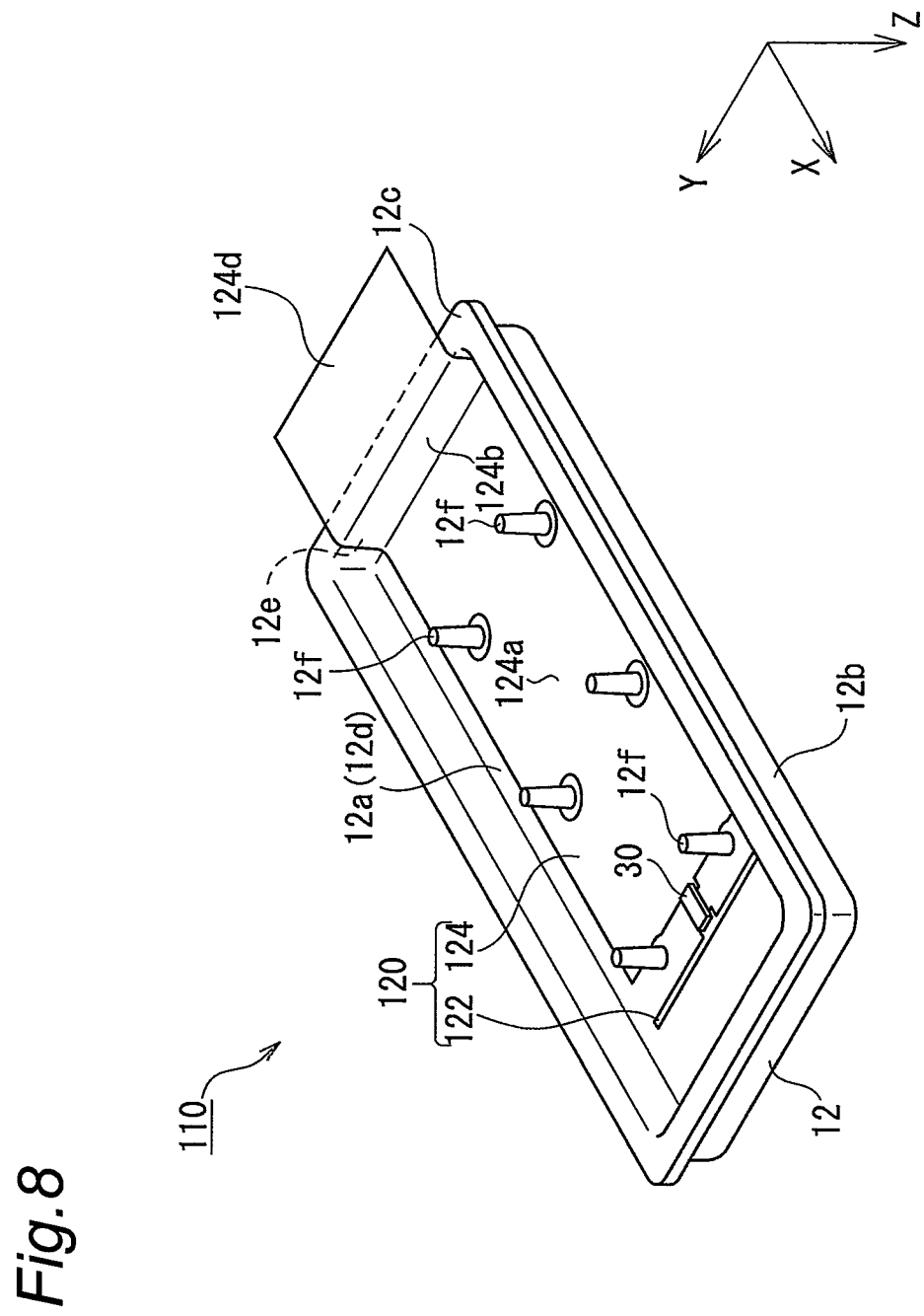
FIG. 8 is a perspective view of an RFID tag according to a second exemplary embodiment.
Figure 9:
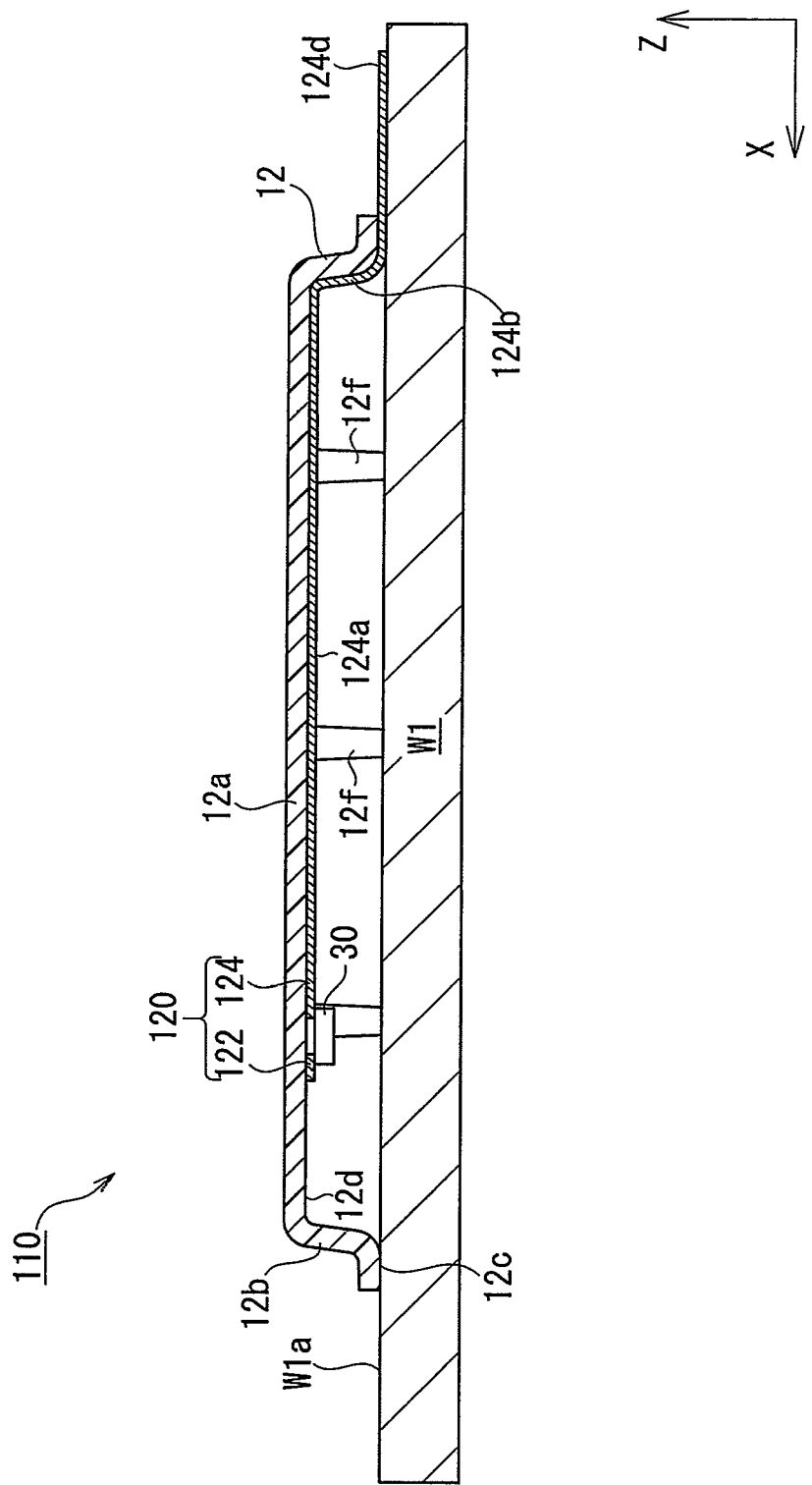
FIG. 9 is a cross-sectional view of the RFID tag attached to the metal surface of the article.

FIG. 8 is a perspective view of an RFID tag according to the second embodiment, and FIG. 9 is a cross-sectional view.

As shown in FIG. 8, in an antenna pattern 120 of an RFID tag 110 according to the second embodiment, a first sub-pattern 122 is substantially the same as the first sub-pattern 22 in the first embodiment.

In the case of the second embodiment, an extension part 124b of a second sub-pattern 124 of the antenna pattern 120 extends away from the back surface 12d of the top plate part 12a of the cap-shaped member 12 and extends beyond the opening edge part 12c. Therefore, as shown in FIG. 9, when the RFID tag 110 is attached to the metal surface W1a of the article W1, a leading end 124d of the extension part 124b of the second sub-pattern 124 is located outside the cap-shaped member 12.

In the case of the first embodiment, as shown in FIG. 2, the leading end portion 24d of the extension part 24b of the second sub-pattern 24 in the antenna pattern 20 is located on the opening edge part 12c of the cap-shaped member 12.

In contrast, in the case of the second embodiment, as shown in FIG. 8, the extension part 124b of the second sub-pattern 124 is beyond the opening edge part 12c of the cap-shaped member 12. Therefore, the extension part 124b of the second sub-pattern 124 can be connected to the metal surface W1a of the article W1 in terms of a direct current or capacitively in a larger area as compared to the extension part 24b of the second sub-pattern 24 in the first embodiment. As a result, the extension part 124b of the second sub-pattern 124 can more reliably be connected to the metal surface W1a in terms of a direct current, or capacitively through a conductive double-sided tape, for example.

According to an exemplary aspect, the portion of the second sub-pattern 124 extending outside the cap-shaped member 12 as shown in FIG. 9 may be a member separate from the other portions. For example, a leading end portion of the extension part 124b of the second sub-pattern 124 may be located on the opening edge part 12c of the cap-shaped member 12 as in the first embodiment, and a conductor sheet may be connected to the leading end portion. For example, the conductor sheet is a conductive adhesive tape, and a tape surface on the side opposite to an adhesive layer is attached to the leading end portion of the second sub-pattern 124 located on the opening edge part 12c of the cap-shaped member 12.

As in the first embodiment, a simple structure is achieved also in the RFID tag 110 according to the second embodiment as described above so that the RFIC chip 34 (RFIC module 30) and the antenna pattern 20 connected thereto can be protected while enabling wireless communication even when the RFID tag is attached to the metal surface W1a.

Third Exemplary Embodiment

A third embodiment partially includes the same configuration as the first embodiment and is different from the first embodiment in that the embodiment is configured to be usable in severe environment exposed to liquid such as water/dust/chloride/sulfide of rain, dust, ultraviolet light, or the like. Therefore, the third embodiment will mainly be described in terms of differences from the first embodiment.

Figure 10:
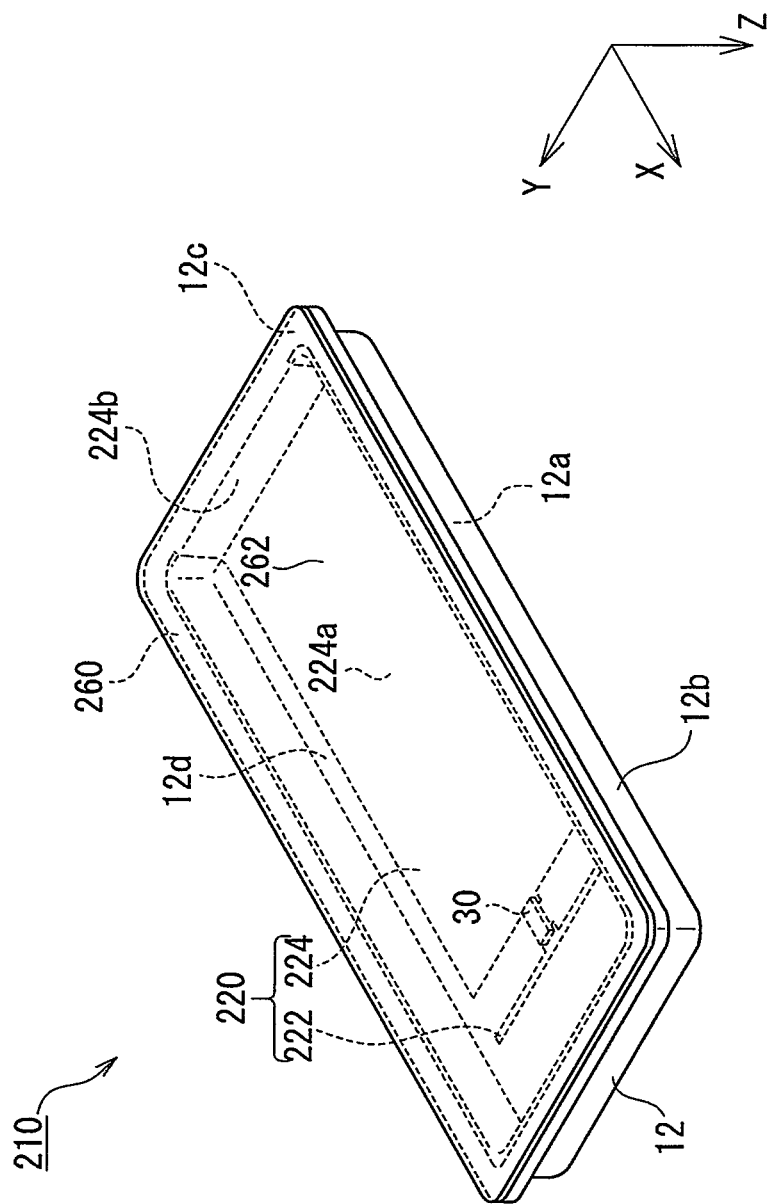
FIG. 10 is a perspective view of an RFID tag according to a third exemplary embodiment.

FIG. 10 is a perspective view of an RFID tag according to the third embodiment, and FIG. 11 is a cross-sectional view.

As shown in FIG. 10, an antenna pattern 220 of an RFID tag 210 according to the third embodiment is structurally substantially the same as the antenna pattern 20 of the first embodiment. An extension part 224b of a second sub-pattern 224 in the antenna pattern 220 extends from a main body part 224a to the opening edge part 12c of the cap-shaped member 12.

However, in the case of the third embodiment, an annular pattern 260 made of a conductor such as copper is disposed on the annular opening edge part 12c of the cap-shaped member 12. The extension part 224b of the second sub-pattern 224 in the antenna pattern 220 is connected to the annular pattern 260.

When the RFID tag 210 is not attached to the metal surface W1a of the article W1, the antenna pattern 220 (as well as the RFIC module 30) is not exposed to the outside in the case of the third embodiment unlike the antenna pattern 20 of the first embodiment. Specifically, as shown in FIGS. 10 and 11, in the case of the third embodiment, a metal plate (conductor plate) 262 is attached to the opening edge part 12c of the cap-shaped member 12 to cover the inside of the cap-shaped member 12.

The metal plate 262 is a copper plate, for example, and is electrically and mechanically connected via solder to the annular pattern 260 on the opening edge part 12c of the cap-shaped member 12. By joining the metal plate 262 and the cap-shaped member 12 with solder, the inside of the cap-shaped member 12 is sealed, and the antenna pattern 220 and the RFIC module 30 inside thereof are protected from liquids and dust. Therefore, a metal-compatible tag with high water resistance and dust resistance can be produced. Additionally, by using a highly heat-resistant resin material such as polyether ether ketone (PEEK) resin for the cap-shaped member 12, a highly heat-resistant tag can be achieved.

When the RFID tag 210 is attached to the metal surface W1a of the article W1, an outer surface 262a of the metal plate 262 is entirely attached to the metal surface W1a via a conductive adhesive or double-sided tape, or an insulating adhesive or double-sided tape. As a result, the extension part 224b of the second sub-pattern 224 in the antenna pattern 220 is connected to the metal surface W1a in terms of a direct current or capacitively through the annular pattern 260 and the metal plate 262. The RFID tag 210 is attached via the entire outer surface 262a of the metal plate 262 and therefore can firmly be attached to the metal surface W1a (as compared to when attached via the opening edge part 12c of the cap-shaped member 12).

For example, the RFID tag 210 according to the third embodiment as described above is fabricated as follows.

FIGS. 12A to 12D show an exemplary manufacturing method of the RFID tag 210 according to the third embodiment.

Figure 12A:
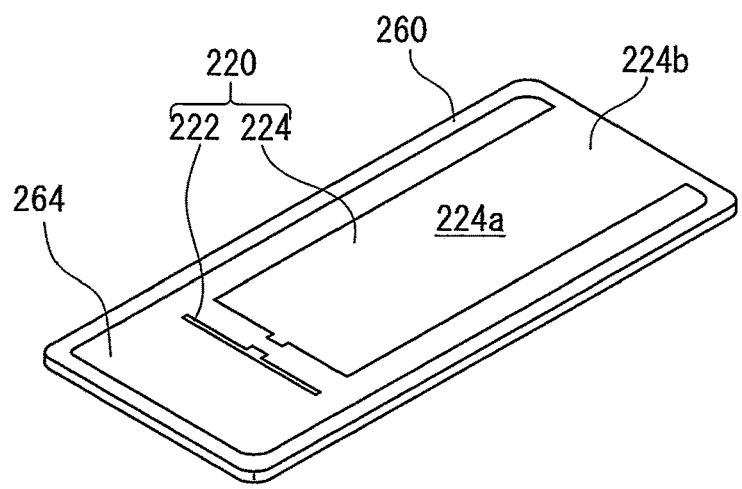
FIG. 12A is a perspective view showing a step in an exemplary manufacturing method of the RFID tag according to the third embodiment.

As shown in FIG. 12A, first, the antenna pattern 220 and the annular pattern 260 are printed on a flat plate 264 made of, for example, a resin material by using a conductive paste of a meal-based material such as silver and copper or an organic conductive material such as carbon. For example, a silver paste is printed along an outer circumferential edge of the flat plate 264 to print the annular pattern 260. In the annular pattern 260, the antenna pattern 220 is printed together such that the extension part 224b of the second sub-pattern 224 is connected to the annular pattern 260.

Figure 12B:
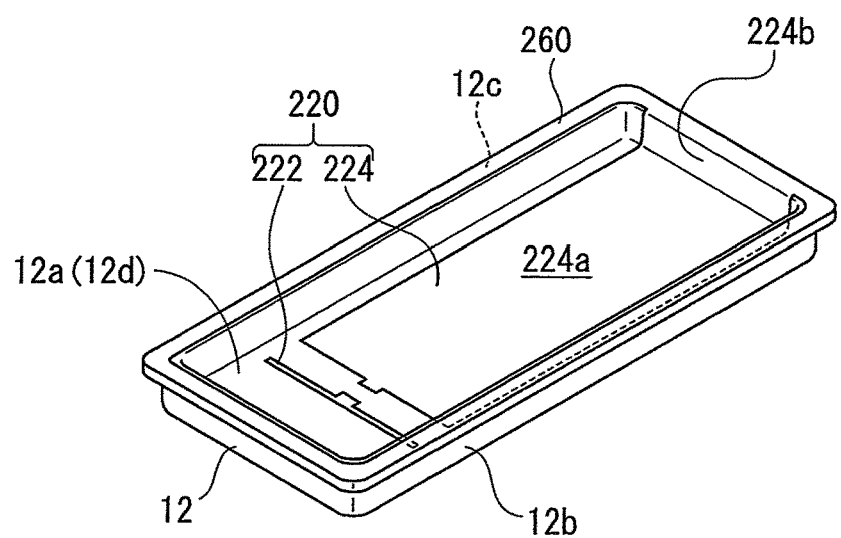
FIG. 12B is a perspective view showing a step following the step of FIG. 12A.

The pattern-printed flat plate 264 is molded into a cap shape by using a mold. For example, if the flat plate 264 is made of a resin material, the flat plate 264 is molded into a cap shape by vacuum molding. As shown in FIG. 12B, the molding is performed to fabricate the cap-shaped member 12 having the antenna pattern 220 present on the back surface 12d of the top plate part 12a and the annular pattern 260 present on the opening edge part 12c.

Subsequently, plating is performed for the cap-shaped member 12 including the antenna pattern 220 and the annular pattern 260 made from the conductive paste. For example, a copper plating layer is formed by electrolytic plating on the patterns of the conductive paste. Since the patterns of the conductive paste contain conductive particles in a binder resin, the plating is performed for reducing a high-frequency resistance component of the antenna so as to improve the electric characteristics of the RFID tag. This improves the communication characteristics of the RFID tag 210, for example, characteristics such as reception sensitivity and power consumption.

Figure 12C:
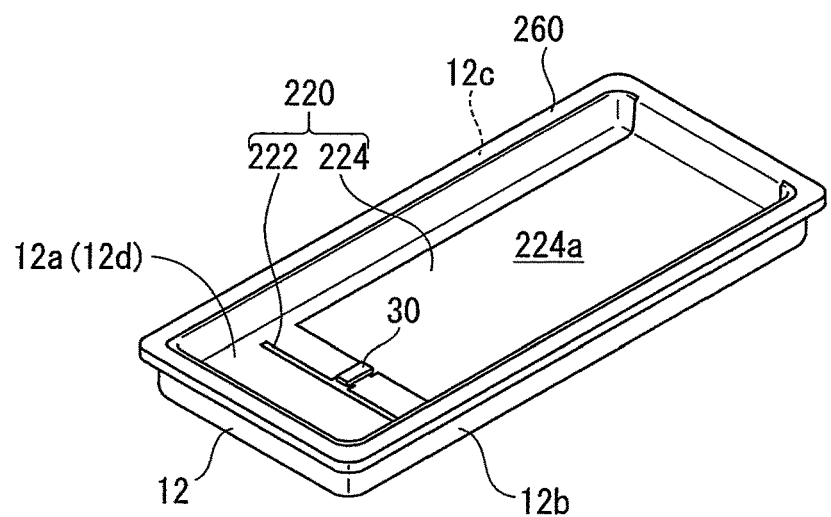
FIG. 12C is a perspective view showing a step following the step of FIG. 12B.

After the copper antenna pattern 220 is fabricated, as shown in FIG. 12C, the RFIC module 30 is attached to the back surface 12d of the top plate part 12a of the cap-shaped member 12. Specifically, as shown in FIG. 5, the one external connection terminal 38 of the RFIC module 30 is soldered to a first sub-pattern 222, and the other external connection terminal 40 is soldered to a second sub-pattern 24. In the case of a metal-compatible tag used near the melting temperature of the solder or at the solder melting temperature or higher, a conductive bonding material melting at a higher temperature than this bonding material may be used.

Figure 12D:
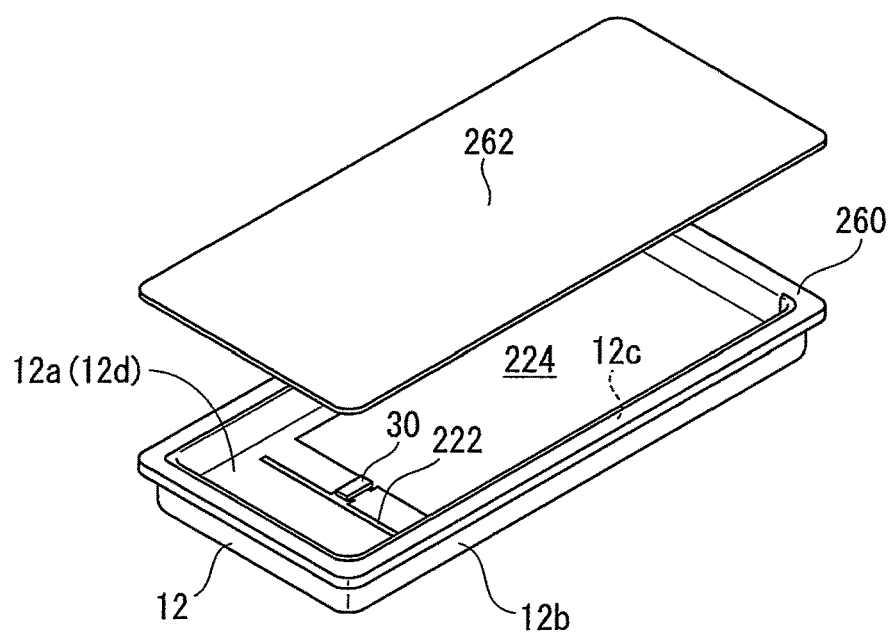
FIG. 12D is a perspective view showing a step following the step of FIG. 12C.

After the RFIC module 30 is attached to the cap-shaped member 12, as shown in FIG. 12D, the metal plate 262 is soldered to the opening edge part 12c of the cap-shaped member 12 to cover the inside of the cap-shaped member 12. As a result, the waterproof/dustproof RFID tag 210 is completed.

The metal plate 262 may be plated depending on the use of the RFID tag 210. For example, a plating layer of nickel or tin may be formed on the metal plate 262 of copper, brass, etc.

The RFID tag 210 according to the third embodiment can be manufactured by another method. For example, the antenna pattern and the annular pattern of the conductive paste may be pattern-formed on the cap-shaped member 12 by a method such as transfer printing or the like. The method may include subsequently forming a copper plating layer on the conductive paste, attaching the RFIC module 30, and attaching the metal plate 262.

A method of forming an antenna pattern without forming a plating layer may be a method of thickly applying a metal paste of silver, copper, etc. or may include printing an antenna pattern by using nano paste and sintering the antenna pattern to fabricate the final antenna pattern without performing plating. In this description, the term "metal nano paste" refers to a paste acquired by containing nano-order metal nanoparticles of silver, copper, etc. in an organic solvent etc. When a liquid suppressing self-fusing of the metal nanoparticles evaporates due to heating or drying, the metal nanoparticles fuse with each other to form a metal film.

As in the first exemplary embodiment, a simple structure is achieved also in the RFID tag 10 according to the third embodiment as described above so that the RFIC chip 34 (RFIC module 30) and the antenna pattern 220 connected thereto can be protected while enabling wireless communication even when the RFID tag is attached to the metal surface W1a.

Although the present invention has been described with reference to a plurality of the first to third embodiments, the embodiments of the present invention is not limited thereto.

For example, the RFIC tag may be configured to detect at least one of ambient temperature and humidity and output the detected result to the outside. For example, a temperature sensor and a humidity sensor are incorporated in the RFIC chip. Alternatively, a temperature sensor and a humidity sensor are disposed in the RFIC module together with the RFIC chip.

Since the RFIC module with a temperature sensor is disposed on the back surface of the top plate part of the cap-shaped member, the temperature sensor can detect the temperature outside the cap-shaped member with high accuracy. More specifically, the temperature sensor indirectly detects the external temperature by substantially detecting the temperature of the cap-shaped member in contact with the outside air. Therefore, as compared to the case that a module with a temperature sensor is disposed away from the cap-shaped member across a space unlike this case, the temperature sensor can detect the external temperature with high accuracy even when the external temperature sharply changes in a short time.

When the humidity sensor is disposed in the RFIC module, a communicating hole for allowing communication between the internal space and the outside is disposed in the cap-shaped member.

The antenna pattern of the RFID tag according to the embodiments of the present invention is not limited to the antenna patterns 20, 120, 220 of the first to third embodiments.

For example, an antenna pattern 320 of an RFID tag 310 according to another embodiment shown in FIG. 13 includes a first sub-pattern 322 and a second sub-pattern 324 as in the first to third embodiments. The second sub-pattern 324 includes an extension part 324b. However, the pattern is different from the first to third embodiments in that the second sub-pattern 324 is formed into a meander shape. Specifically, two notch parts 324e are formed in a main body part 324a of the second sub-pattern 324 disposed on the back surface 12d of the top plate part 12a of the cap-shaped member 12. One of the notch parts 324e is disposed at one of the ends in the width direction (Y-axis direction) of the second sub-pattern 324, and the other notch part 324e is disposed at the other end in the width direction. The second sub-pattern 324 as described above can widen the frequency band of the communication signal of the RFID tag.

Figure 14:
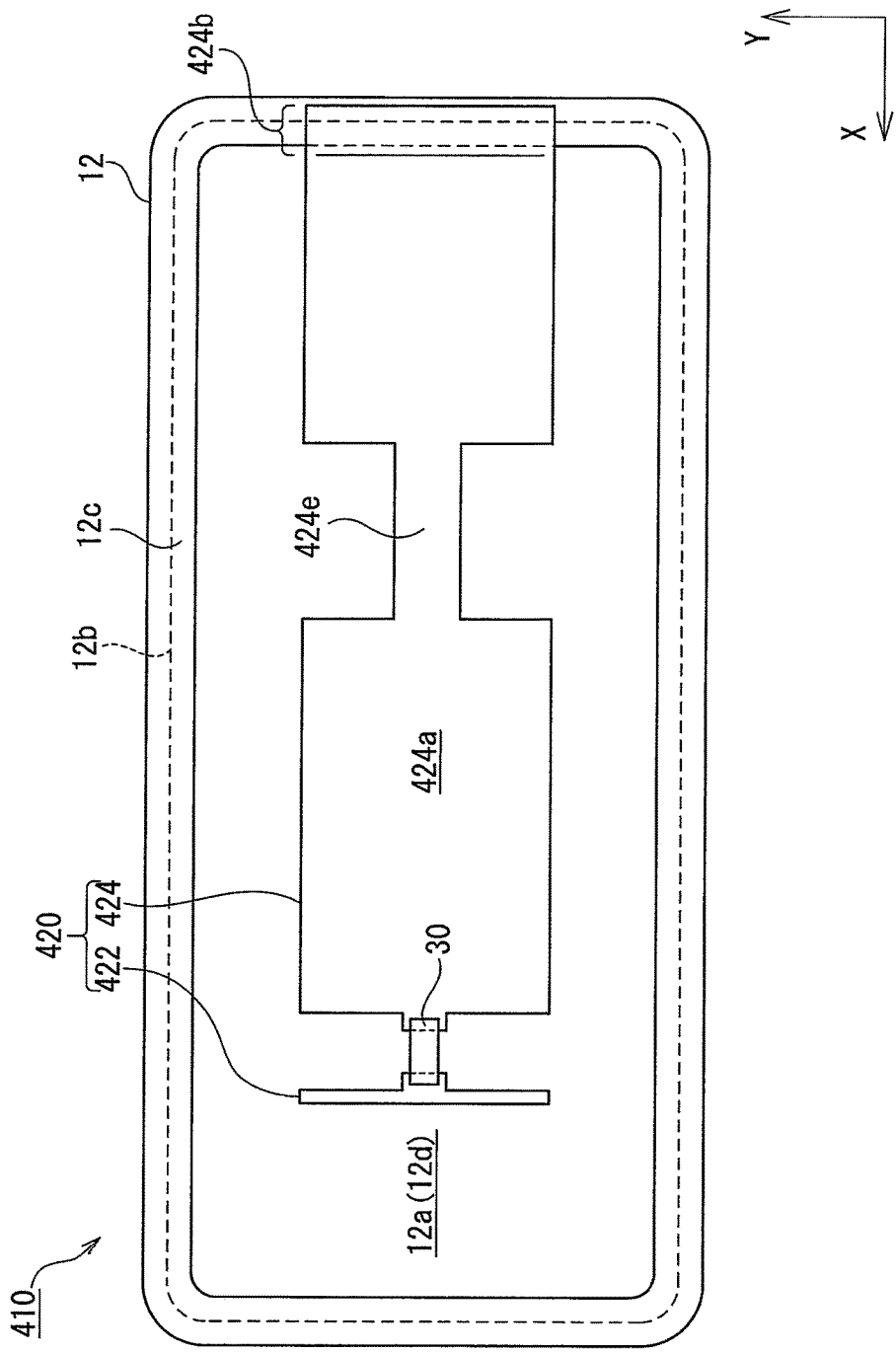
FIG. 14 is a bottom view of an RFID tag according to yet another embodiment.

An antenna pattern 420 of an RFID tag 410, according to another embodiment shown in FIG. 14, also has a first sub-pattern 422 and a second sub-pattern 424 as in the first to third embodiments. The second sub-pattern 424 includes an extension part 424b. Additionally, a main body part 424a of the second sub-pattern 424 disposed on the back surface 12d of the top plate part 12a of the cap-shaped member 12 includes a neck part 424e. In the neck part 424e, the current concentrates as compared to the other parts. This current concentration increases the inductance of the second sub-pattern 424 as compared to when no neck part is included. By appropriately setting the shape of the neck part, the inductance of the second sub-pattern 424 can be adjusted as desired.

Figure 15:
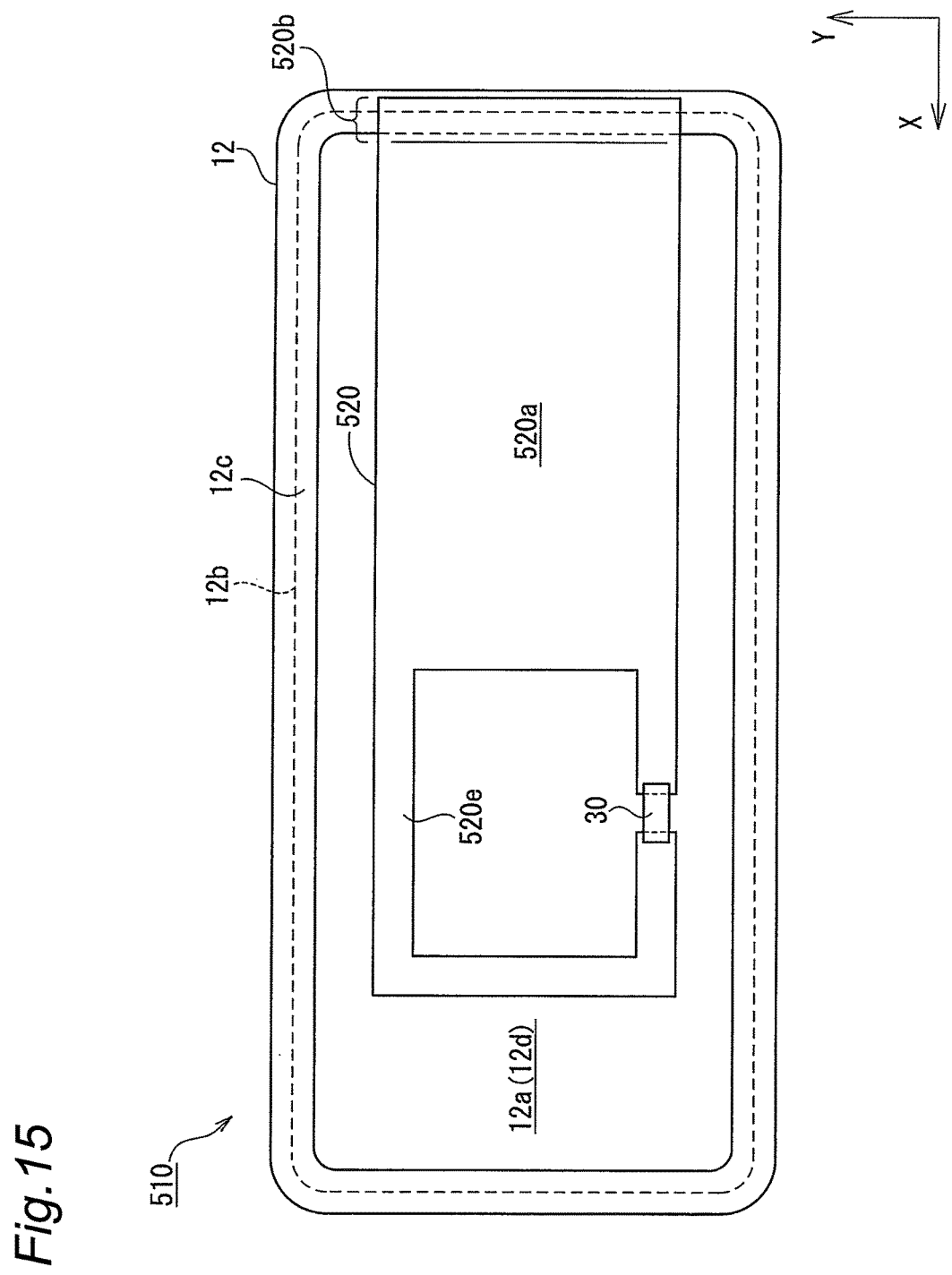
FIG. 15 is a bottom view of an RFID tag according to a further embodiment.

Furthermore, an antenna pattern 520 of an RFID tag 510 according to a further embodiment shown in FIG. 15 is one pattern not divided into two separate patterns, unlike the first to third embodiments. An extension part 520b is disposed in the one pattern. A main body part 520a of the antenna pattern 520 disposed on the back surface 12d of the top plate part 12a of the cap-shaped member 12 includes a loop part 520e. The RFIC module 30 is connected to the loop part 520e. As a result, the antenna pattern 520 functions as a magnetic field antenna.

Figure 16:
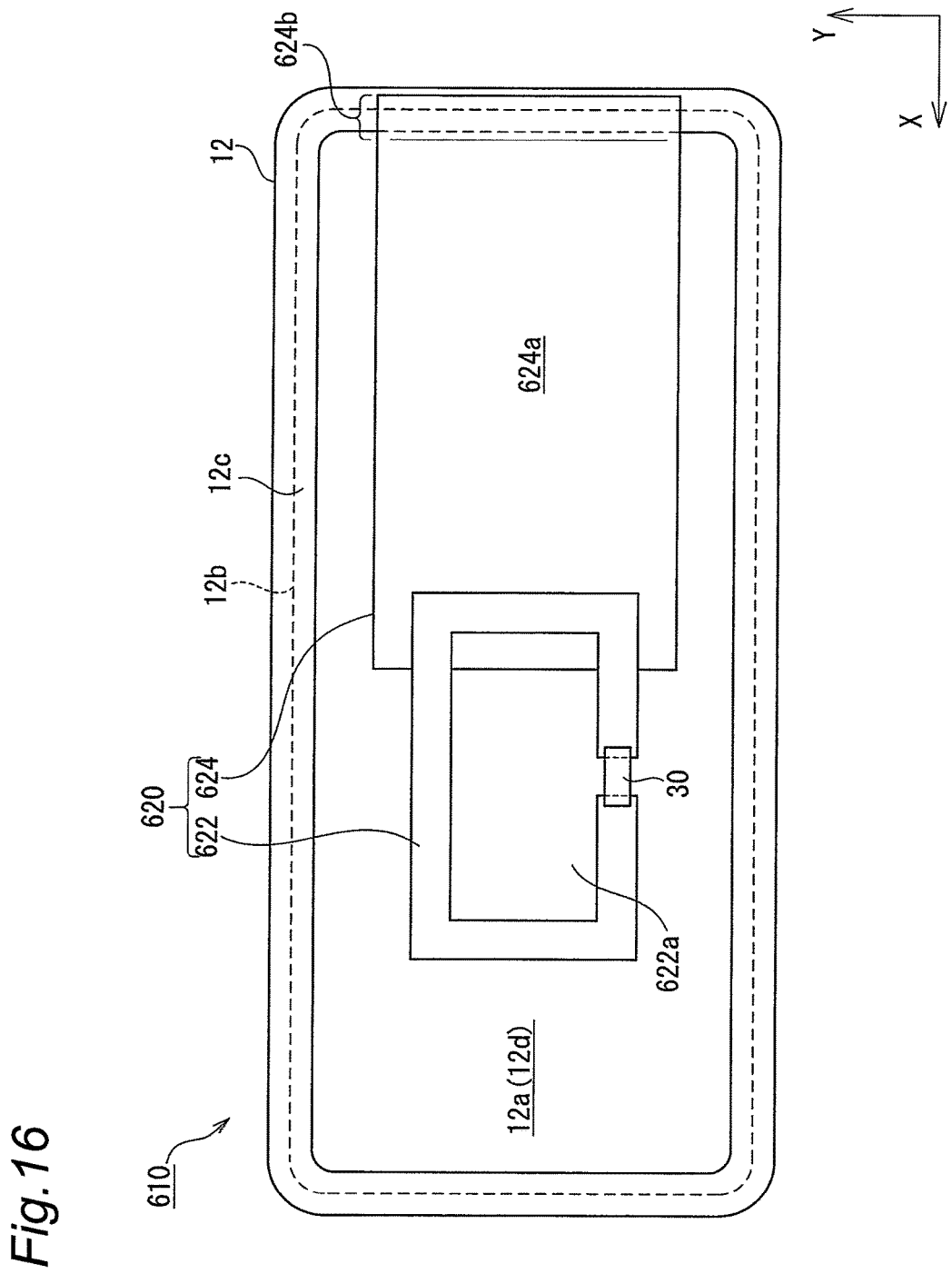
FIG. 16 is a bottom view of an RFID tag according to a yet further embodiment.

Furthermore, an antenna pattern 620 of an RFID tag 610 according to a yet further embodiment, as shown in FIG. 16, includes a loop-shaped loop pattern 622 and a belt-shaped pattern 624 having a belt shape. An extension part 624b is disposed in the belt-shaped pattern 624. The RFIC module 30 is connected to the loop pattern 622. Additionally, the loop pattern 622 is partially overlapped with the belt-shaped pattern 624 for connection to the belt-shaped pattern 624. By adjusting a degree of the overlap, i.e., an area of the belt-shaped pattern 624 covering a loop opening 622a of the loop pattern 622, the communication characteristics, for example, the frequency band, of the RFID tag 610 can be adjusted.

As described above, the embodiments according to the present invention are not limited in terms of the shape of the antenna pattern, or particularly, the shape of the portion of the antenna pattern disposed on the back surface of the top plate part of the cap-shaped member. This shape can variously be changed depending on the use and usage environment of the RFID tag.

Figure 17:
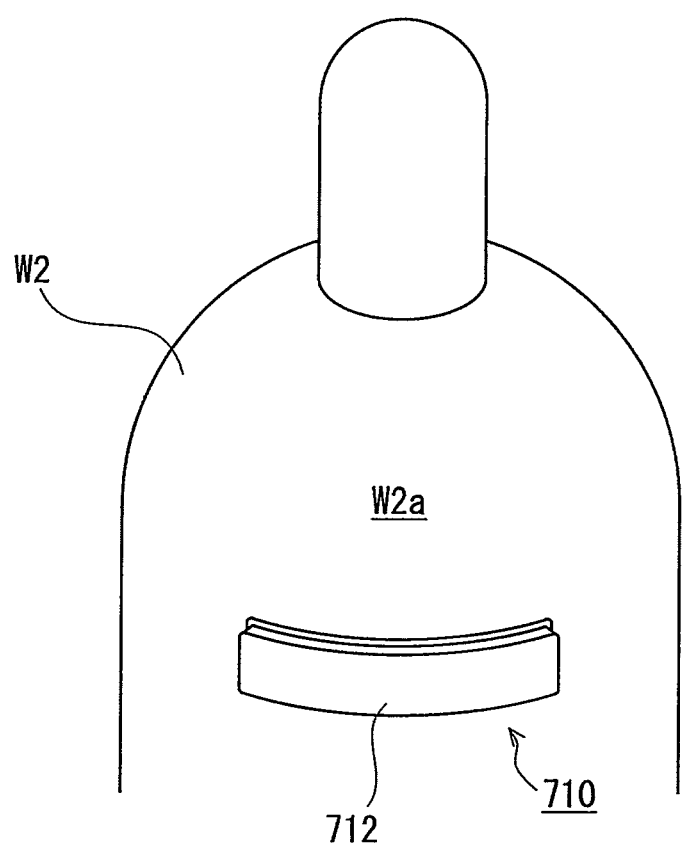
FIG. 17 is a perspective view of an RFID tag attached to a gas cylinder.

Additionally, as shown in FIG. 1, the RFID tag 10 is attached to the metal surface W1a of the article W1 that is a flat surface; however, the embodiments according to the present invention are not limited thereto. For example, FIG. 17 shows an RFID tag 710 attached to a curved surface W2a of a gas cylinder W2. In this case, the RFID tag 710 includes a cap-shaped member 712 made of a resin material and having flexibility. Alternatively, an opening edge part of the cap-shaped member 712 has a shape capable of engaging with the curved surface W2a of the gas cylinder W2.

Therefore, the RFID tag according to the exemplary embodiments of the present invention can be used even when attached to various articles having metal surfaces of arbitrary shapes, for example, metal surfaces of office desks, drum cans, etc. and can be used even when attached to non-metal surfaces.

Figure 18:
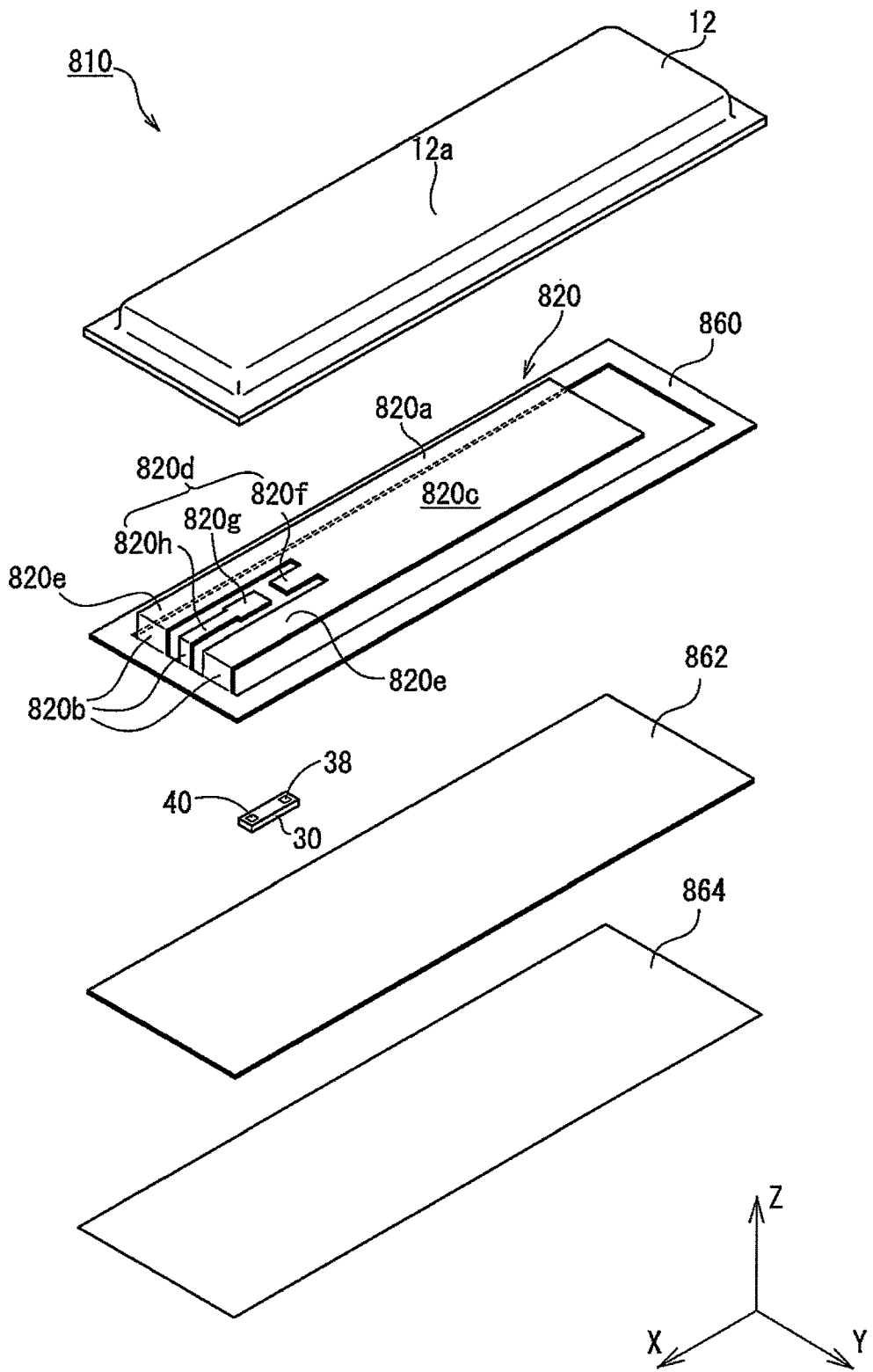
FIG. 18 is an exploded perspective view of an RFID tag according to a fourth exemplary embodiment.
Figure 19:
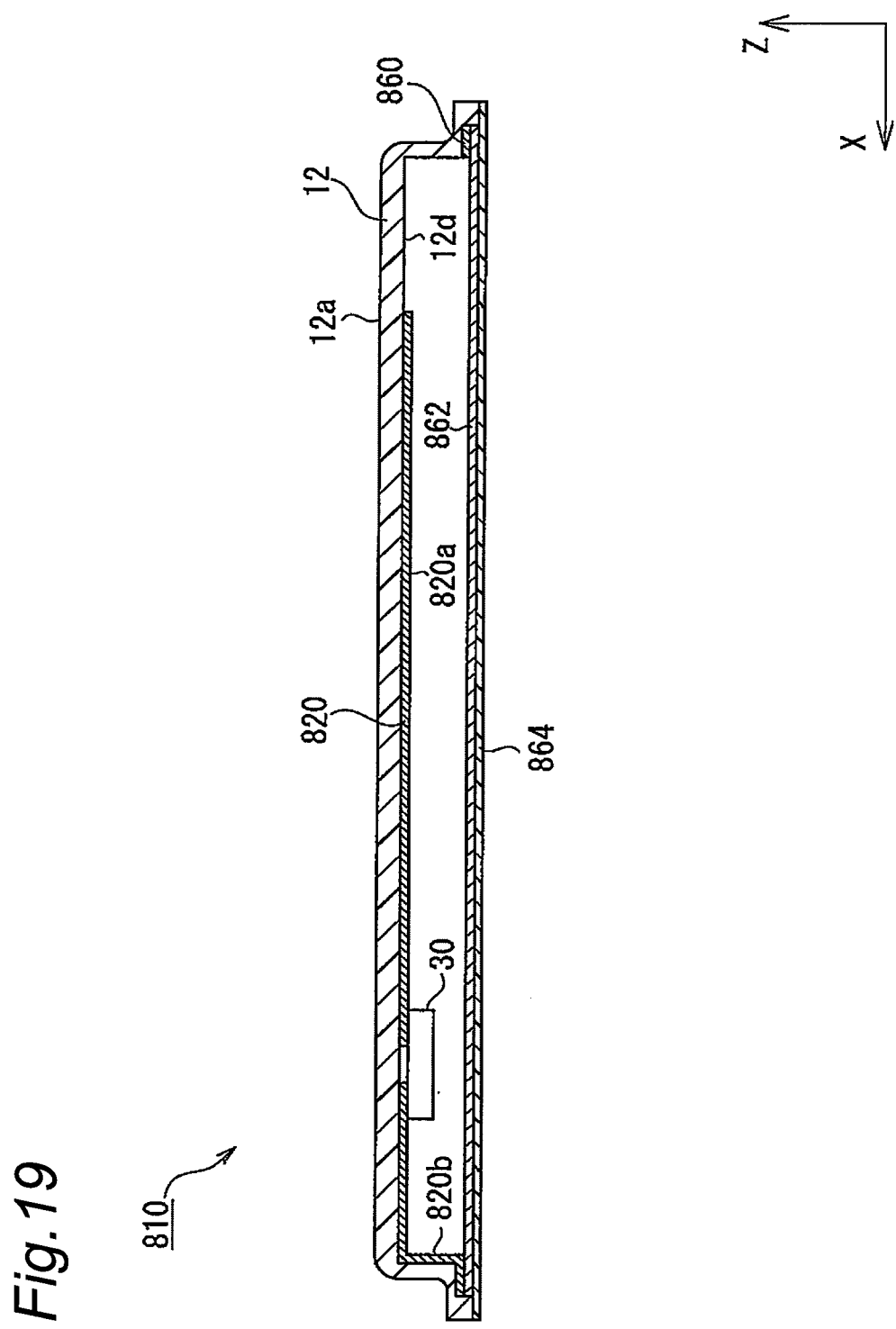
FIG. 19 is a cross-sectional view of the RFID tag according to the fourth embodiment.
Figure 20:
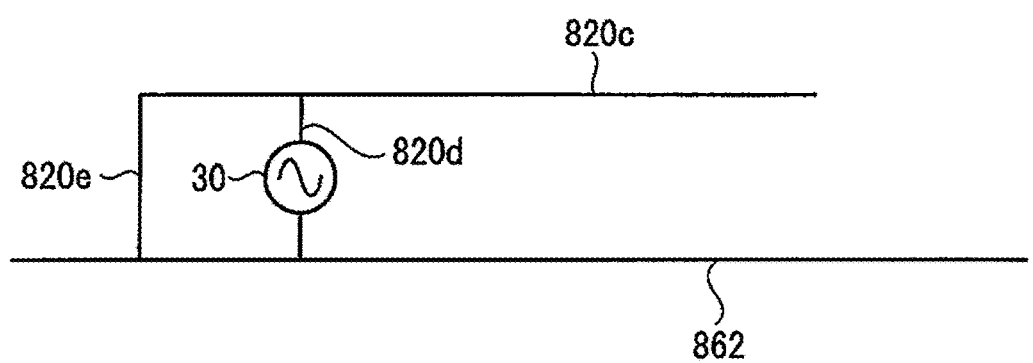
FIG. 20 is an equivalent circuit diagram of the RFID tag according to the fourth embodiment.

FIG. 18 is an exploded perspective view of an RFID tag according to a fourth exemplary embodiment. FIG. 19 is a cross-sectional view of the RFID tag according to the fourth embodiment. FIG. 20 is an equivalent circuit diagram of the RFID tag according to the fourth embodiment.

As shown in FIG. 18, in the RFID tag 810 according to the fourth embodiment, an antenna pattern 820 and an annular pattern 860 are made of a single metal sheet (or metal plate), for example. The antenna pattern 820 is formed by cutting and raising a portion of the metal sheet. As a result, the antenna pattern 820 and the annular pattern 860 are integrated as one component. The metal sheet is made from nickel/tin-plated brass that is easily cut and raised, for example.

To integrate the antenna pattern 820 and the annular pattern 860 as one component, the antenna pattern 820 is an inverted-F antenna.

Specifically, as shown in FIG. 19, the antenna pattern 820 includes a main body part 820a attached to the back surface 12 of the top plate part 12a of the cap-shaped member 12 and an extension part 820b connected to the annular pattern 860.

As shown in FIG. 20, the main body part 820a of the antenna pattern 820 functions as an inverted-F antenna. Therefore, as shown in FIG. 18, the main body part 820a includes a radiating part 820c radiating radio waves, a feeder line part 820d connecting the radiating part 820c and the annular pattern 860 (i.e., a metal plate 862 connected to the annular pattern 860), and short-circuit line parts 820e connecting the radiating part 820c and the annular pattern 860.

The feeder line 820d in the main body 820a of the antenna pattern 820 serving as an inverted-F antenna is made up of the RFIC module 30, a land part 820f connected to the one external connection terminal 38 of the RFIC module 30, a land part 820g connected to the other external connection terminal 40 of the RFIC module 30, and a connection part 820h connecting the land part 820g and the extension part 820b.

The short-circuit line 820e are two portions of the main body part 820a connecting the radiating part 820c and the extension part 820b with the feeder line part 820d interposed therebetween. The two short-circuit line 820e exist such that a position between the extension part 820b and the connection part 820h is appropriately bent when the antenna pattern 820 is cut and raised. Specifically, before cutting and raising the antenna pattern 820, the extending part 820b and the connecting part 820h have an elongated belt shape extending linearly. If one of the two short-circuit line 820e does not exist, a position between the extension part 820b and the connection part 820h is not appropriately bent so that the connection part 820h may be twisted relative to the extension part 820b when the antenna pattern 820 is cut and raised. If twisted, the extension part 820b and the connecting part 820h may be divided. Alternatively, the land part 820g and the other external connection terminal 40 of the RFIC module 30 may not properly electrically be connected in a subsequent step. As a countermeasure, the two short-circuit line parts 820e are disposed such that the feeder line part 820d is interposed therebetween.

The metal plate 862 connected to the annular pattern 860 is preferably made of the same material as the annular pattern 860, for example, nickel/tin-plated brass. A tin component reduces the contact resistance. A double-sided tape 864 for affixing the RFID tag 810 to an article is affixed to the metal plate 862.

Snap engagement may be used as a method of attaching the antenna pattern 820 and the annular pattern 860 made from one metal sheet to the cap-shaped member 12 made of a resin material. Specifically, multiple through-holes are formed for each of the antenna pattern 820 and the annular pattern 860 made of metal. Multiple projections for snap engagement with the multiple through-holes are disposed on the cap-shaped member 12. The antenna pattern 820 and the annular pattern 860 can easily be disposed on the cap-shaped member 12 by snap-engaging the multiple projections respectively with the corresponding through-holes. By riveting (e.g., melting) tips of the projections after the snap engagement, the antenna pattern 820 and the annular pattern 860 can more firmly be fixed to the cap-shaped member 12.

In the fourth embodiment, as compared with the third embodiment, it is not necessary to fabricate the antenna pattern separated into multiple pieces from one metal sheet, so that the manufacturing steps of the RFID tag can be simplified. For example, in the case that the antenna pattern 220 is fabricated by punching one metal sheet to form the first sub-pattern 222 and the second sub-pattern 224, i.e., two parts, in the third embodiment, an operation is required for attaching the two parts to the cap-shaped member 12 while being positioned with respect to each other; however, in the case that the antenna pattern 820 is fabricated and formed as one part by punching one metal sheet in the fourth embodiment, the positioning as described above is not necessary.

Figure 21:
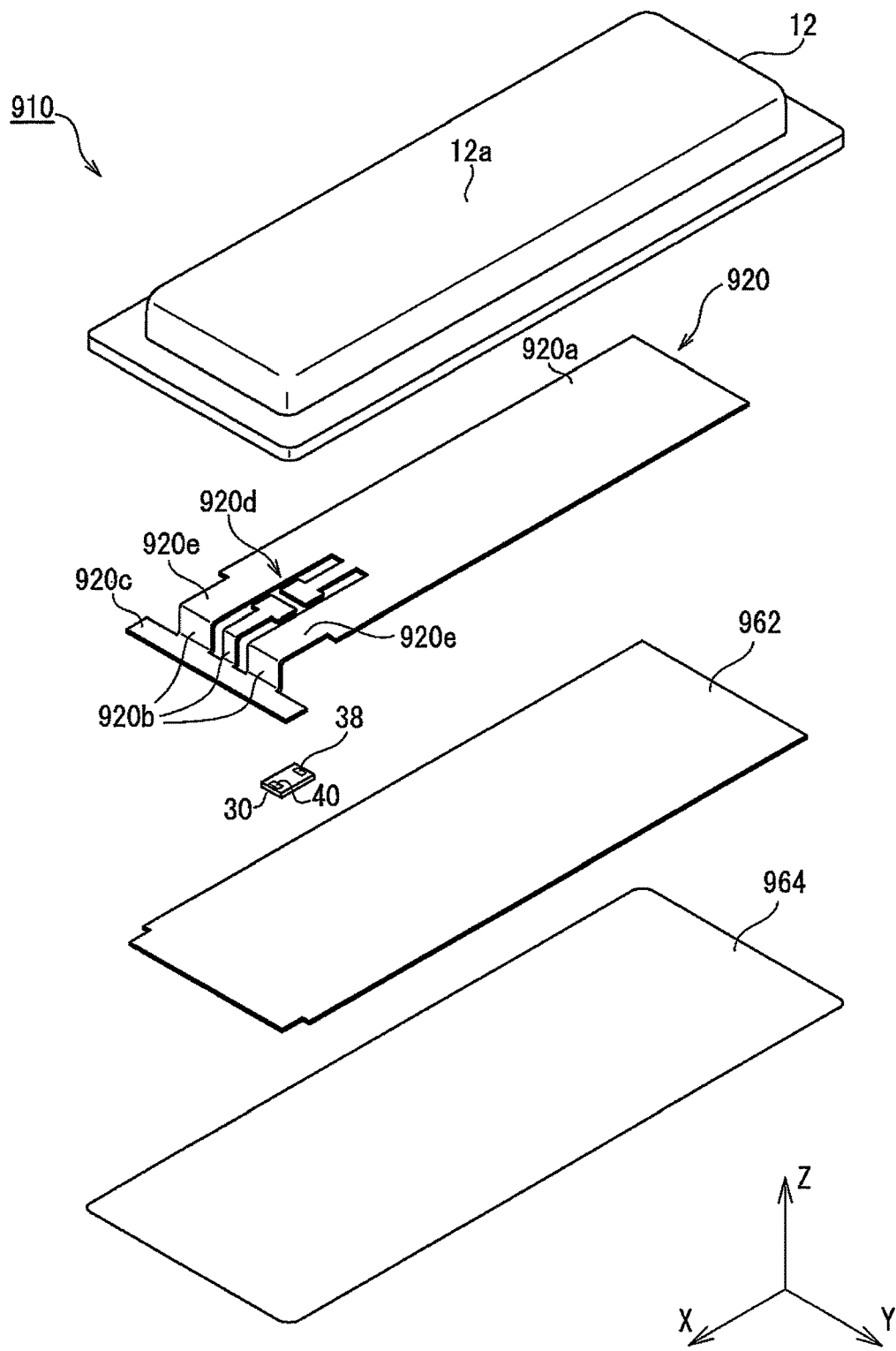
FIG. 21 is an exploded perspective view of an RFID tag according to a modification of the fourth embodiment.

FIG. 21 is an exploded perspective view of an RFID tag according to a modification of the fourth embodiment.

As shown in FIG. 21, an RFID tag 910 according to the modification of the fourth embodiment is different from the RFID tag 810 shown in FIG. 18 including the annular pattern 860 connecting the antenna pattern 820 and the metal plate 862. Instead of the annular pattern, a belt-shaped terminal part 920c disposed at one end of an antenna pattern 920 is directly connected to a metal plate 962. To the terminal part 920c, a feeder line 920d and short-circuit line 920e of a main body part 920a of the antenna pattern 920 are connected via an extension part 920b. The belt-shaped terminal part 920c and the metal plate 962 are joined by soldering etc., thereby increasing connection reliability.

Figure 22:
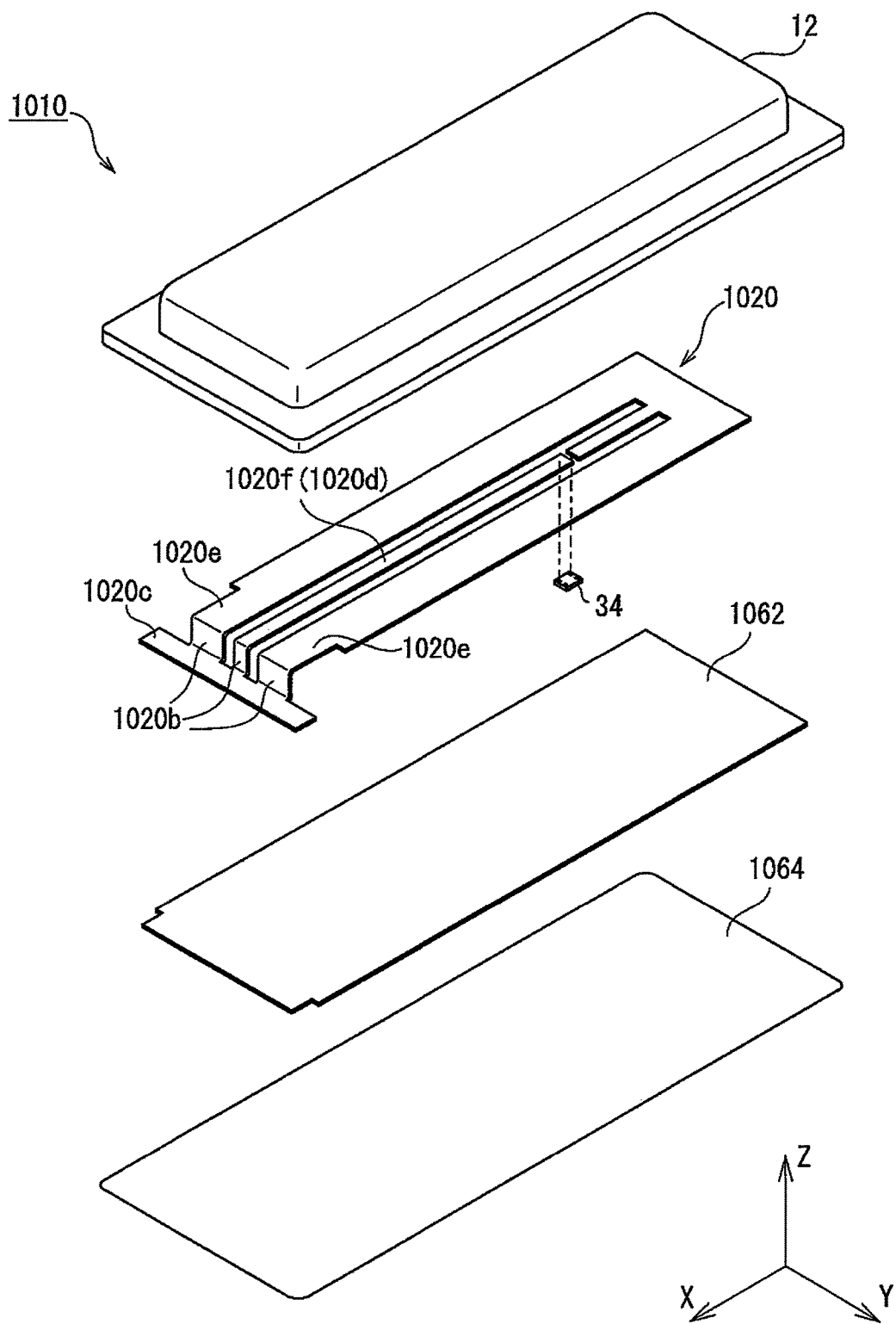
FIG. 22 is an exploded perspective view of an RFID tag according to another modification of the fourth embodiment.

FIG. 22 is an exploded perspective view of an RFID tag according to another modification of the fourth embodiment.

As shown in FIG. 22, an RFID tag 1010 according to the other modification of the fourth embodiment is different from the RFID tag 810 shown in FIG. 18 in which the RFIC module 30 including the RFIC chip and the matching circuit is attached to the antenna pattern 820. Specifically, the RFIC chip 34 is directly attached to an antenna pattern 1020. Instead of the matching circuit, by forming an appropriate length of a connection-side conducting wire part 1020f of a feeder line part 1020d connected to a terminal part 1020c via an extension part 1020b, i.e., by adjusting the inductance of the connection-side conducting wire part 1020f, matching is achieved between the antenna pattern 1020 and the RFIC chip 34. In this case, the RFIC chip 34 may have a form of a packaged semiconductor element.

Additionally, in the RFID tag according to the exemplary embodiments of the present invention described above, the cap-shaped member serving as a tag main body is not limited to a member having the internal space sealed when attached to a metal surface of an article via the opening edge part thereof. For example, the cap-shaped member may include a hole allowing communication between the internal space and the outside in a state of being attached to the metal surface. Furthermore, the tag main body is not limited to a cap shape in which the top plate supporting part supporting the top plate part is a tube-shaped side wall part. For example, the top plate supporting part of the tag main body may be two flat plate-shaped side wall parts parallel to each other. Alternatively, for example, the top plate supporting part may be four column parts (in this case, the tag main body has a table shape). Alternatively, for example, extremely speaking, the tag main body may include the top plate part and one column part extending from the top plate part on the back surface side. In the case of this extreme example, the tag main body has a parasol shape.

Additionally, for the first to third embodiments, as shown in FIG. 5, the RFIC chip 34 can be modularized as the RFIC module 30 together with the matching circuit (inductance element). However, it is noted that the exemplary embodiments of the present invention are not limited thereto. The RFIC chip may directly be disposed on the cap-shaped member without being modularized. In this case, a matching circuit is also directly disposed on the cap-shaped member as needed.

It is apparent for those skilled in the art that at least one other embodiment can entirely or partially be combined with a certain embodiment to form a further embodiment according to the present invention.

Specifically, in a broad sense, the RFID tag of the exemplary embodiments according to the present invention is an RFID tag that can be used when attached to a metal surface of an article. In this aspect, the RFID tag includes a tag main body including a top plate with a back surface facing the metal surface across a space and a top plate supporting part (i.e., a side wall) extending from the top plate part on the back surface side and including a leading end surface attached to the metal surface, an antenna pattern disposed on the back surface of the top plate part of the tag main body, and an RFIC chip disposed on the back surface of the top plate part of the tag main body and connected to the antenna pattern. Moreover, according to the exemplary aspect, the antenna pattern includes an extension part extending away from the back surface of the top plate part of the tag main body toward the metal surface and connecting to the metal surface in terms of a direct current or capacitively.

In view of the foregoing exemplary embodiments, it should be appreciated that the present invention provides for RFID tags that are configured to be attached to a metal surface before use.

EXPLANATIONS OF LETTERS OR NUMERALS

10 RFID tag
12 tag main body (cap-shaped member)
12a top plate part
12b top plate supporting part (side wall part)
12d back surface
20 antenna pattern
24b extension part
W1 article
W1a metal surface

The invention claimed is:

1. An RFID tag configured to communicate data while attached to a metal surface of an article, the RFID tag comprising:
  a main body including:
    a top plate with a back surface facing the metal surface of the article with a space therebetween when the RFID tag is attached to the article, and
    a side wall extending from the top plate and having a leading end surface attached to the metal surface;
  an antenna pattern disposed on the back surface of the top plate of the main body and including an extension part that extends away from the back surface of the top plate towards the metal surface of the article and is configured to connect to the metal surface of the article by at least one of a direct current or capacitively; and
  an RFIC chip disposed on the back surface of the top plate of the main body and connected to the antenna pattern.

2. The RFID tag according to claim 1,
  wherein the main body is a cap-shaped member in which the side wall extends in a tube shape from an outer circumferential edge of the top plate, and
  wherein the leading end surface of the side wall is an opening edge of the cap-shaped member that is attached to the metal surface of the article.

3. The RFID tag according to claim 2, wherein the extension part includes a leading end that is located on a portion of the opening edge of the cap-shaped member.

4. The RFID tag according to claim 2, wherein the extension part of the antenna pattern extends beyond the opening edge towards an outside of the cap-shaped member.

5. The RFID tag according to claim 2,
  wherein an annular pattern of a conductor is disposed on the opening edge of the cap-shaped member, and
  wherein the extension part of the antenna pattern is connected to the annular pattern.

6. The RFID tag according to claim 5, further comprising a conductor plate attached to the opening edge to cover an inside of the cap-shaped member and connected to the annular pattern.

7. The RFID tag according to claim 5, wherein the antenna pattern is an inverted-F antenna, and the antenna pattern and the annular pattern are integrated as one component by connecting a feeder line and a short-circuit line of the inverted-F antenna to the annular pattern.

8. The RFID tag according to claim 2, further comprising:
  an RFIC module that includes the RFIC chip and a matching circuit configured to match the RFIC chip and the antenna pattern,
  wherein the RF IC module further includes at least one of a temperature sensor configured to detect an external temperature of the cap-shaped member and a humidity sensor configured to detect an external humidity of the cap-shaped member.

9. The RFID tag according to claim 1,
  wherein the antenna pattern includes a first sub-pattern connected to a first input/output terminal of the RFIC chip and a second sub-pattern spaced at a distance from the first sub-pattern and connected to a second input/output terminal of the RFIC chip, and
  wherein the second sub-pattern includes the extension part.

10. The RFID tag according to claim 9, wherein the first sub-pattern has a surface area smaller than a surface area of the second sub-pattern, and the first sub-pattern includes a first belt-shaped part extending in a first direction and a second belt-shaped part extending in a second direction opposite to the first direction when viewed from a connection point to the first input/output terminal.

11. The RFID tag according to claim 1, wherein the main body comprises a flexible resin material.

12. The RFID tag according to claim 11, wherein the main body includes an auxiliary support that extends from the back surface of the top plate to contact the metal surface to suppress deformation of the main body when the RFID tag is attached to the metal surface of the article.

13. The RFID tag according to claim 1, wherein the extension part of the antenna pattern extends between the leading end surface of the side wall and the metal surface of the article, such that the extension part is directly connected between the side wall and the metal surface by at least one of a conductive adhesive and a double-sided tape.

14. An article attachable to an RFID tag for data communication thereof relating to the article, the article comprising:
a metal surface; and
an RFID tag attached to the metal surface, the RFID tag including:
a main body having a top plate with a back surface facing the metal surface of the article with a space therebetween when the RFID tag is attached to the article, and a side wall extending from the top plate and having a leading end surface attached to the metal surface,
an antenna pattern disposed on the back surface of the top plate of the main body and including an extension part that extends away from the back surface of the top plate towards the metal surface of the article and is configured to connect to the metal surface of the article by at least one of a direct current or capacitively, and
an RFIC chip disposed on the back surface of the top plate of the main body and connected to the antenna pattern.

15. The article according to claim 14,
wherein the antenna pattern of the RFID tag includes a first sub-pattern connected to a first input/output terminal of the RFIC chip and a second sub-pattern spaced at a distance from the first sub-pattern and connected to a second input/output terminal of the RFIC chip, and
wherein the second sub-pattern includes the extension part.

16. The article according to claim 15, wherein the first sub-pattern has a surface area smaller than a surface area of the second sub-pattern, and the first sub-pattern includes a first belt-shaped part extending in a first direction and a second belt-shaped part extending in a second direction opposite to the first direction when viewed from a connection point to the first input/output terminal.

17. The article according to claim 15,
wherein the main body is a cap-shaped member in which the side wall extends in a tube shape from an outer circumferential edge of the top plate, and
wherein the leading end surface of the side wall is an opening edge of the cap-shaped member that is attached to the metal surface of the article.

18. The article according to claim 17, wherein the extension part includes a leading end that is located on a portion of the opening edge of the cap-shaped member.

19. The article according to claim 17, wherein the extension part of the antenna pattern extends beyond the opening edge towards an outside of the cap-shaped member.

20. An RFID tag manufacturing method comprising:
printing an annular pattern on an outer circumferential edge of a flat plate;
printing an antenna pattern connected to the annular pattern in the annular pattern using a conductive paste;
after the printing, molding the flat plate into a cap shape to fabricate a cap-shaped member that includes the antenna pattern on a back surface of a top plate and the annular pattern on an opening edge of the cap-shaped member;
forming a plating layer on the annular pattern and the antenna pattern by electrolytic plating;
disposing an RFIC chip on the back surface of the top plate of the cap-shaped member;
connecting the RFIC chip to the antenna pattern; and
attaching to the opening edge of the cap-shaped member a conductor plate that covers an inside of the cap-shaped member and is connected to the annular pattern.

* * * * *